(12) United States Patent  
Villavicencio

(10) Patent No.: US 7,765,298 B2  
(45) Date of Patent: *Jul. 27, 2010

(54) IMPERSONATION IN AN ACCESS SYSTEM

(75) Inventor: Francisco J. Villavicencio, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 871 days.

This patent is subject to a terminal disclaimer.

(21) Appl. No.: 11/560,469

(22) Filed: Nov. 16, 2006

(65) Prior Publication Data

US 2007/0089167 A1    Apr. 19, 2007

Related U.S. Application Data

(63) Continuation of application No. 09/998,915, filed on Nov. 30, 2001, now Pat. No. 7,225,256.

(51) Int. Cl.  
*G06F 15/16* (2006.01)

(52) U.S. Cl. .................... 709/225; 709/223; 709/226; 709/224; 713/150; 713/159; 713/172; 713/168; 713/185; 713/164; 713/161; 726/6; 726/4; 726/8; 726/5; 726/7

(58) Field of Classification Search ................ 709/225, 709/100, 217, 226, 227, 228, 246  
See application file for complete search history.

(56) References Cited

U.S. PATENT DOCUMENTS

| 4,484,306 A | 11/1984 | Kulczyckyj et al. |
| 4,956,769 A | 9/1990 | Smith |
| 4,961,224 A | 10/1990 | Yung |
| 5,077,666 A | 12/1991 | Brimm et al. |
| 5,113,499 A | 5/1992 | Ankney et al. |
| 5,226,143 A | 7/1993 | Baird et al. |
| 5,301,320 A | 4/1994 | McAtee et al. |
| 5,428,795 A | 6/1995 | Johnson et al. |
| 5,455,953 A | 10/1995 | Russell |
| 5,530,861 A | 6/1996 | Diamant et al. |

(Continued)

FOREIGN PATENT DOCUMENTS

WO    WO 02/07396 A1    1/2002

OTHER PUBLICATIONS

Barrett, Debbie, "Diary of a Break-And-Enter, Cyber Style," Technology in Government, p. 22, Jan. 2000.

(Continued)

*Primary Examiner*—Jude J Jean Gilles  
(74) *Attorney, Agent, or Firm*—Townsend and Townsend and Crew, LLP

(57) ABSTRACT

The present invention pertains to a system for managing network access to resources that allows a first entity to impersonate a second entity. In one embodiment, the first entity can impersonate the second entity without knowing the second entity's password and/or without altering anything in the entity's set of personal information. This invention provides the first entity with the ability to troubleshoot in a live production system without disrupting the users or the system. In one embodiment, the first entity authenticates as itself. Access to resources is provided in response to an authorization process based on the identity of the entity being impersonated.

48 Claims, 12 Drawing Sheets

U.S. PATENT DOCUMENTS

| | | |
|---|---|---|
| 5,557,742 A | 9/1996 | Smaha et al. |
| 5,581,691 A | 12/1996 | Hsu et al. |
| 5,659,616 A | 8/1997 | Sudia |
| 5,678,041 A | 10/1997 | Baker et al. |
| 5,689,679 A | 11/1997 | Jouppi |
| 5,692,125 A | 11/1997 | Schloss et al. |
| 5,708,780 A | 1/1998 | Levergood et al. |
| 5,734,837 A | 3/1998 | Flores et al. |
| 5,745,574 A | 4/1998 | Muftic |
| 5,757,920 A | 5/1998 | Misra et al. |
| 5,764,890 A | 6/1998 | Glasser et al. |
| 5,765,153 A | 6/1998 | Benantar et al. |
| 5,793,966 A | 8/1998 | Amstein et al. |
| 5,796,841 A | 8/1998 | Cordery et al. |
| 5,802,518 A | 9/1998 | Karaev et al. |
| 5,812,776 A | 9/1998 | Gifford |
| 5,819,271 A | 10/1998 | Mahoney et al. |
| 5,822,454 A | 10/1998 | Rangarajan |
| 5,826,029 A | 10/1998 | Gore, Jr. et al. |
| 5,831,975 A | 11/1998 | Chen et al. |
| 5,842,212 A | 11/1998 | Ballurio et al. |
| 5,867,665 A | 2/1999 | Butman et al. |
| 5,867,824 A | 2/1999 | Saito et al. |
| 5,872,969 A | 2/1999 | Copeland et al. |
| 5,875,461 A | 2/1999 | Lindholm |
| 5,884,284 A | 3/1999 | Peters et al. |
| 5,889,952 A | 3/1999 | Hunnicutt et al. |
| 5,892,903 A | 4/1999 | Klaus |
| 5,893,149 A | 4/1999 | Hagersten et al. |
| 5,903,878 A | 5/1999 | Talati et al. |
| 5,903,882 A | 5/1999 | Asay et al. |
| 5,907,621 A | 5/1999 | Bachman et al. |
| 5,907,837 A | 5/1999 | Ferrel et al. |
| 5,908,469 A | 6/1999 | Botz et al. |
| 5,924,096 A | 7/1999 | Draper et al. |
| 5,940,394 A | 8/1999 | Killian |
| 5,940,834 A | 8/1999 | Pinard et al. |
| 5,944,780 A | 8/1999 | Chase et al. |
| 5,944,824 A | 8/1999 | He |
| 5,960,422 A | 9/1999 | Prasad |
| 5,961,593 A | 10/1999 | Gabber et al. |
| 5,966,702 A | 10/1999 | Fresko et al. |
| 5,978,779 A | 11/1999 | Stein et al. |
| 5,987,457 A | 11/1999 | Ballard |
| 5,987,471 A | 11/1999 | Bodine et al. |
| 5,991,768 A | 11/1999 | Sun et al. |
| 5,991,771 A | 11/1999 | Falls et al. |
| 5,991,807 A | 11/1999 | Schmidt et al. |
| 5,991,810 A | 11/1999 | Shapiro et al. |
| 5,991,881 A | 11/1999 | Conklin et al. |
| 5,999,911 A | 12/1999 | Berg et al. |
| 6,005,571 A | 12/1999 | Pachauri |
| 6,012,059 A | 1/2000 | Neimat et al. |
| 6,012,098 A | 1/2000 | Bayeh et al. |
| 6,026,474 A | 2/2000 | Carter et al. |
| 6,028,605 A | 2/2000 | Conrad et al. |
| 6,029,195 A | 2/2000 | Herz |
| 6,032,227 A | 2/2000 | Shaheen et al. |
| 6,041,306 A | 3/2000 | Du et al. |
| 6,041,357 A | 3/2000 | Kunzelman et al. |
| 6,044,462 A | 3/2000 | Zubeldia et al. |
| 6,058,381 A | 5/2000 | Nelson |
| 6,058,480 A | 5/2000 | Brown |
| 6,061,726 A | 5/2000 | Cook et al. |
| 6,061,740 A | 5/2000 | Ferguson et al. |
| 6,061,799 A | 5/2000 | Eldridge et al. |
| 6,064,656 A | 5/2000 | Angal et al. |
| 6,073,109 A | 6/2000 | Flores et al. |
| 6,073,174 A | 6/2000 | Montgomerie et al. |
| 6,073,242 A | 6/2000 | Hardy et al. |
| 6,081,518 A | 6/2000 | Bowman-Amuah |
| 6,088,679 A | 7/2000 | Barkley |
| 6,088,796 A | 7/2000 | Cianfrocca et al. |
| 6,098,056 A | 8/2000 | Rusnak et al. |
| 6,105,063 A | 8/2000 | Hayes, Jr. |
| 6,105,066 A | 8/2000 | Hayes, Jr. |
| 6,112,181 A | 8/2000 | Shear et al. |
| 6,119,167 A | 9/2000 | Boyle et al. |
| 6,131,120 A | 10/2000 | Reid |
| 6,133,916 A | 10/2000 | Bukszar et al. |
| 6,134,658 A | 10/2000 | Multerer et al. |
| 6,138,104 A | 10/2000 | Marchak et al. |
| 6,141,778 A | 10/2000 | Kane et al. |
| 6,151,531 A | 11/2000 | Frankel et al. |
| 6,154,741 A | 11/2000 | Feldman |
| 6,154,776 A | 11/2000 | Martin |
| 6,157,925 A | 12/2000 | Jenkins et al. |
| 6,157,942 A | 12/2000 | Chu et al. |
| 6,158,010 A | 12/2000 | Moriconi et al. |
| 6,163,844 A | 12/2000 | Duncan et al. |
| 6,170,013 B1 | 1/2001 | Murata |
| 6,173,311 B1 | 1/2001 | Hassett et al. |
| 6,178,418 B1 | 1/2001 | Singer |
| 6,182,086 B1 | 1/2001 | Lomet et al. |
| 6,182,142 B1 | 1/2001 | Win et al. |
| 6,185,608 B1 | 2/2001 | Hon et al. |
| 6,185,650 B1 | 2/2001 | Boonie et al. |
| 6,192,476 B1 | 2/2001 | Gong |
| 6,195,689 B1 | 2/2001 | Bahlmann |
| 6,195,696 B1 | 2/2001 | Baber et al. |
| 6,208,986 B1 | 3/2001 | Schneck et al. |
| 6,212,558 B1 | 4/2001 | Antur et al. |
| 6,212,640 B1 | 4/2001 | Abdelnur et al. |
| 6,216,199 B1 | 4/2001 | DeKoning et al. |
| 6,216,231 B1 | 4/2001 | Stubblebine |
| 6,219,667 B1 | 4/2001 | Lu et al. |
| 6,223,291 B1 | 4/2001 | Puhl et al. |
| 6,226,752 B1 | 5/2001 | Gupta et al. |
| 6,230,185 B1 | 5/2001 | Salas et al. |
| 6,233,576 B1 | 5/2001 | Lewis |
| 6,233,618 B1 | 5/2001 | Shannon |
| 6,240,360 B1 | 5/2001 | Phelan |
| 6,240,414 B1 | 5/2001 | Beizer et al. |
| 6,243,816 B1 | 6/2001 | Fang et al. |
| 6,253,248 B1 | 6/2001 | Nakai et al. |
| 6,256,739 B1 | 7/2001 | Skopp et al. |
| 6,263,332 B1 | 7/2001 | Nasr et al. |
| 6,263,363 B1 | 7/2001 | Rosenblatt et al. |
| 6,266,420 B1 | 7/2001 | Langford et al. |
| 6,275,916 B1 | 8/2001 | Weldon, Jr. et al. |
| 6,275,944 B1 | 8/2001 | Kao et al. |
| 6,279,001 B1 | 8/2001 | DeBettencourt et al. |
| 6,282,546 B1 | 8/2001 | Gleichauf et al. |
| 6,286,098 B1 | 9/2001 | Wenig et al. |
| 6,289,462 B1 | 9/2001 | McNabb et al. |
| 6,292,833 B1 | 9/2001 | Liao et al. |
| 6,295,061 B1 | 9/2001 | Park et al. |
| 6,301,668 B1 | 10/2001 | Gleichauf et al. |
| 6,304,949 B1 | 10/2001 | Houlsdworth |
| 6,311,269 B2 | 10/2001 | Luckenbaugh et al. |
| 6,314,492 B1 | 11/2001 | Allen et al. |
| 6,317,783 B1 | 11/2001 | Freishtat et al. |
| 6,321,338 B1 | 11/2001 | Porras et al. |
| 6,324,656 B1 | 11/2001 | Gleichauf et al. |
| 6,330,569 B1 | 12/2001 | Baisley et al. |
| 6,336,124 B1 | 1/2002 | Alam et al. |
| 6,336,141 B1 | 1/2002 | Fujiyama et al. |
| 6,336,214 B1 | 1/2002 | Sundaresan |
| 6,338,097 B1 | 1/2002 | Krenzke et al. |
| 6,339,423 B1 | 1/2002 | Sampson et al. |
| 6,339,826 B2 | 1/2002 | Hayes, Jr. et al. |
| 6,345,266 B1 | 2/2002 | Ganguly et al. |
| 6,347,312 B1 | 2/2002 | Byrne et al. |
| 6,347,374 B1 | 2/2002 | Drake et al. |

| | | | | | | |
|---|---|---|---|---|---|---|
| 6,357,010 B1 | 3/2002 | Viets et al. | | 6,671,695 B2 | 12/2003 | McFadden |
| 6,366,913 B1 | 4/2002 | Fitler, Jr. et al. | | 6,675,261 B2 | 1/2004 | Shandony |
| 6,367,013 B1 | 4/2002 | Bisbee et al. | | 6,678,733 B1 | 1/2004 | Brown et al. |
| 6,374,359 B1 | 4/2002 | Shrader et al. | | 6,678,828 B1 | 1/2004 | Pham et al. |
| 6,381,579 B1 | 4/2002 | Gervais et al. | | 6,691,232 B1 | 2/2004 | Wood et al. |
| 6,385,653 B1 | 5/2002 | Sitaraman et al. | | 6,697,849 B1 | 2/2004 | Carlson |
| 6,389,589 B1 | 5/2002 | Mishra et al. | | 6,711,632 B1 | 3/2004 | Chow et al. |
| 6,393,569 B1 | 5/2002 | Orenshteyn | | 6,718,328 B1 | 4/2004 | Norris |
| 6,397,232 B1 | 5/2002 | Cheng-Hung et al. | | 6,728,685 B1 | 4/2004 | Ahluwalia |
| 6,408,336 B1 | 6/2002 | Schneider et al. | | 6,741,853 B1 | 5/2004 | Jiang et al. |
| 6,415,321 B1 | 7/2002 | Gleichauf et al. | | 6,741,992 B1 | 5/2004 | McFadden |
| 6,421,682 B1 | 7/2002 | Craig et al. | | 6,742,126 B1 | 5/2004 | Mann et al. |
| 6,421,768 B1 * | 7/2002 | Purpura ...................... 711/164 | | 6,745,221 B1 | 6/2004 | Ronca |
| 6,421,781 B1 | 7/2002 | Fox et al. | | 6,745,327 B1 | 6/2004 | Messing |
| 6,430,688 B1 | 8/2002 | Kohl et al. | | 6,748,374 B1 | 6/2004 | Madan et al. |
| 6,434,531 B1 | 8/2002 | Lancelot et al. | | 6,748,447 B1 | 6/2004 | Basani et al. |
| 6,438,690 B1 | 8/2002 | Patel et al. | | 6,748,569 B1 | 6/2004 | Brooke et al. |
| 6,442,567 B1 | 8/2002 | Retallick et al. | | 6,751,797 B1 | 6/2004 | Desgranges et al. |
| 6,453,342 B1 | 9/2002 | Himmel et al. | | 6,754,696 B1 | 6/2004 | Kamath et al. |
| 6,457,066 B1 | 9/2002 | Mein et al. | | 6,754,702 B1 | 6/2004 | Kennelly et al. |
| 6,460,141 B1 | 10/2002 | Olden | | 6,757,708 B1 | 6/2004 | Craig et al. |
| 6,463,418 B1 | 10/2002 | Todd | | 6,763,370 B1 | 7/2004 | Schmeidler et al. |
| 6,463,509 B1 | 10/2002 | Teoman et al. | | 6,772,214 B1 | 8/2004 | McClain et al. |
| 6,466,932 B1 | 10/2002 | Dennis et al. | | 6,775,704 B1 | 8/2004 | Watson et al. |
| 6,470,386 B1 | 10/2002 | Combar et al. | | 6,775,782 B1 | 8/2004 | Buros et al. |
| 6,487,663 B1 | 11/2002 | Jaisimha et al. | | 6,779,120 B1 | 8/2004 | Valente et al. |
| 6,493,702 B1 | 12/2002 | Adar et al. | | 6,782,379 B2 | 8/2004 | Lee |
| 6,493,731 B1 | 12/2002 | Jones et al. | | 6,785,726 B1 | 8/2004 | Freeman et al. |
| 6,499,107 B1 | 12/2002 | Gleichauf et al. | | 6,791,949 B1 | 9/2004 | Ryu et al. |
| 6,507,847 B1 | 1/2003 | Fleischman | | 6,804,221 B1 | 10/2004 | Magret et al. |
| 6,507,857 B1 | 1/2003 | Yalcinalp | | 6,816,871 B2 | 11/2004 | Lee |
| 6,513,056 B1 | 1/2003 | Copeland et al. | | 6,826,696 B1 | 11/2004 | Chawla et al. |
| 6,519,571 B1 | 2/2003 | Guheen et al. | | 6,842,863 B1 | 1/2005 | Fox et al. |
| 6,519,643 B1 | 2/2003 | Foulkes et al. | | 6,851,054 B2 | 2/2005 | Wheeler et al. |
| 6,519,648 B1 | 2/2003 | Eyal | | 6,854,016 B1 | 2/2005 | Kraenzel et al. |
| 6,519,767 B1 | 2/2003 | Carter et al. | | 6,859,834 B1 | 2/2005 | Arora et al. |
| 6,523,027 B1 | 2/2003 | Underwood | | 6,868,406 B1 | 3/2005 | Ogg et al. |
| 6,526,438 B1 | 2/2003 | Bienvenu et al. | | 6,879,995 B1 | 4/2005 | Chinta et al. |
| 6,526,447 B1 | 2/2003 | Giammaria | | 6,886,170 B1 | 4/2005 | Bahrs et al. |
| 6,536,037 B1 | 3/2003 | Guheen et al. | | 6,901,433 B2 | 5/2005 | San Andres et al. |
| 6,539,021 B1 | 3/2003 | Kennelly et al. | | 6,901,588 B1 | 5/2005 | Krapf et al. |
| 6,539,379 B1 | 3/2003 | Vora et al. | | 6,957,237 B1 | 10/2005 | Traversat et al. |
| 6,539,382 B1 | 3/2003 | Byrne et al. | | 6,959,415 B1 | 10/2005 | Soderberg et al. |
| 6,539,396 B1 | 3/2003 | Bowman-Amuah | | 6,968,503 B1 | 11/2005 | Chang et al. |
| 6,540,142 B1 | 4/2003 | Alleshouse | | 6,970,862 B2 | 11/2005 | Kwan |
| 6,542,515 B1 | 4/2003 | Kumar et al. | | 6,981,043 B2 | 12/2005 | Botz et al. |
| 6,542,993 B1 | 4/2003 | Erfani | | 7,225,256 B2 * | 5/2007 | Villavicencio ............... 709/225 |
| 6,557,039 B1 | 4/2003 | Leong et al. | | 2001/0007133 A1 | 7/2001 | Moriconi et al. |
| 6,564,370 B1 | 5/2003 | Hunt | | 2001/0023440 A1 | 9/2001 | Franklin et al. |
| 6,571,216 B1 | 5/2003 | Garg et al. | | 2001/0027439 A1 | 10/2001 | Holtzman et al. |
| 6,571,279 B1 | 5/2003 | Herz et al. | | 2001/0037469 A1 | 11/2001 | Gupta et al. |
| 6,574,675 B1 | 6/2003 | Swenson | | 2001/0049770 A1 | 12/2001 | Cai et al. |
| 6,578,147 B1 | 6/2003 | Shanklin et al. | | 2001/0054153 A1 | 12/2001 | Wheeler et al. |
| 6,584,548 B1 | 6/2003 | Bourne et al. | | 2002/0032684 A1 | 3/2002 | Kobayashi et al. |
| 6,584,569 B2 | 6/2003 | Reshef et al. | | 2002/0053023 A1 | 5/2002 | Patterson et al. |
| 6,587,856 B1 | 7/2003 | Srinivasan et al. | | 2002/0062435 A1 | 5/2002 | Nemirovsky et al. |
| 6,591,260 B1 | 7/2003 | Schwarzhoff et al. | | 2002/0065701 A1 | 5/2002 | Kim et al. |
| 6,591,347 B2 | 7/2003 | Tischler et al. | | 2002/0078307 A1 | 6/2002 | Zahir |
| 6,598,058 B2 | 7/2003 | Bird et al. | | 2002/0091745 A1 | 7/2002 | Ramamurthy et al. |
| 6,606,644 B1 | 8/2003 | Ford et al. | | 2002/0091798 A1 | 7/2002 | Joshi et al. |
| 6,609,198 B1 | 8/2003 | Wood et al. | | 2002/0091836 A1 | 7/2002 | Moetteli |
| 6,609,205 B1 | 8/2003 | Bernhard et al. | | 2002/0099671 A1 | 7/2002 | Mastin Crosbie et al. |
| 6,611,916 B1 | 8/2003 | Cacace-Bailey et al. | | 2002/0099822 A1 | 7/2002 | Rubin et al. |
| 6,615,218 B2 | 9/2003 | Mandal et al. | | 2002/0103819 A1 | 8/2002 | Duvillier et al. |
| 6,618,806 B1 | 9/2003 | Brown et al. | | 2002/0108003 A1 | 8/2002 | Ellis et al. |
| 6,629,132 B1 | 9/2003 | Ganguly et al. | | 2002/0112083 A1 | 8/2002 | Joshi et al. |
| 6,632,251 B1 | 10/2003 | Rutten et al. | | 2002/0112155 A1 | 8/2002 | Martherus et al. |
| 6,636,891 B1 | 10/2003 | LeClair et al. | | 2002/0112185 A1 | 8/2002 | Hodges |
| 6,640,307 B2 | 10/2003 | Viets et al. | | 2002/0116642 A1 | 8/2002 | Joshi et al. |
| 6,643,661 B2 | 11/2003 | Polizzi et al. | | 2002/0120599 A1 | 8/2002 | Knouse et al. |
| 6,647,393 B1 | 11/2003 | Dietterich et al. | | 2002/0129024 A1 | 9/2002 | Lee |
| 6,655,593 B2 | 12/2003 | Alleshouse | | 2002/0129135 A1 | 9/2002 | Delany et al. |
| 6,668,322 B1 | 12/2003 | Wood et al. | | 2002/0129177 A1 | 9/2002 | McGuire et al. |

| | | |
|---|---|---|
| 2002/0133516 A1 | 9/2002 | Davis et al. |
| 2002/0138543 A1 | 9/2002 | Teng et al. |
| 2002/0138572 A1 | 9/2002 | Delany et al. |
| 2002/0138577 A1 | 9/2002 | Teng et al. |
| 2002/0138763 A1 | 9/2002 | Delany et al. |
| 2002/0143865 A1 | 10/2002 | Tung Loo et al. |
| 2002/0143943 A1 | 10/2002 | Lee et al. |
| 2002/0147746 A1 | 10/2002 | Lee |
| 2002/0147801 A1 | 10/2002 | Gullotta et al. |
| 2002/0147813 A1 | 10/2002 | Teng et al. |
| 2002/0152244 A1 | 10/2002 | Dean et al. |
| 2002/0152254 A1 | 10/2002 | Teng |
| 2002/0156879 A1 | 10/2002 | Delany et al. |
| 2002/0165960 A1 | 11/2002 | Chan |
| 2002/0166049 A1 | 11/2002 | Sinn |
| 2002/0169767 A1 | 11/2002 | Harvey |
| 2002/0174238 A1 | 11/2002 | Sinn et al. |
| 2002/0184444 A1 | 12/2002 | Shandony |
| 2003/0065921 A1 | 4/2003 | Chang |
| 2003/0074580 A1 | 4/2003 | Knouse et al. |
| 2003/0105654 A1 | 6/2003 | Macleod et al. |
| 2003/0105862 A1 | 6/2003 | Villavicencio |
| 2003/0110376 A1 | 6/2003 | Wiener et al. |
| 2003/0145074 A1 | 7/2003 | Penick |
| 2003/0149737 A1 | 8/2003 | Lambert et al. |
| 2003/0158897 A1 | 8/2003 | Ben-Natan et al. |
| 2003/0217101 A1 | 11/2003 | Sinn |
| 2003/0217127 A1 | 11/2003 | Sinn |
| 2004/0002903 A1 | 1/2004 | Stolfo et al. |
| 2004/0049675 A1 | 3/2004 | Micali et al. |
| 2004/0064356 A1 | 4/2004 | Saito et al. |
| 2004/0153509 A1 | 8/2004 | Alcorn et al. |

OTHER PUBLICATIONS

Cholter, William La et al., "IBAN: Intrusion Blocker Based on Active Networks," Proceedings of the DARPA Active Networks Conference and Exposition (DANCE'02), 11 pages, 2002.
Cooney, Michael, "IBM Rolls Out Host- And Server-Based Mgmt. Apps," Network World, vol. 12, Issue 6, pp. 6-7, Feb. 6, 1995.
"DNS—Contents," http://www2.rad.com/networks/1998/dns/main.htm, 15 pages, Dec. 7, 1999.
Easter, C., "Method To Report Access Control of LAN Server Resources on a Per User Basis," IBM Technical Disclosure Bulletin, p. 172, Apr. 1992.
Good, G., "The LDAP Data Interchange Format (LDIF)—Technical Specification," RFC 2849, 14 pages, Jun. 2000.
Hayes, Jeff, "Policy-Based Authentication and Authorization: Secure Access to the Network Infrastructure," IEEE, pp. 328-333, 2000.
Hewlett-Packard, "HP Introduces Next-Generation Web Authorization Products for E-Business," Press Release, 3 pages, Jan. 18, 1999.
Hewlett-Packard, "HP Introduces Security for Microsoft NT Extranets, Portals And E-Services," Press Release, 3 pages, Jan. 17, 2000.
Hewlett-Packard, "HP Provides Unprecedented Range of Authentication Options," Press Release, 3 pages, Sep. 1, 1999.
Hitchens, Michael et al., "Design Choices for Symmetric Key Based Inter-domain Authentication Protocols in Distributed Systems," Computer Security Applications Conference, 1996., 12th Annual Dec. 9-13, 1996; pp. 105-116.
Hodges, J. et al., "Lightweight Directory Access Protocol (v3): Extension for Transport Layer Security," RFC 2830, 12 pages, May 2000.
Howard, L., "An Approach for Using LDAP As a Network Information Service," RFC 2307, 20 pages, Mar. 1998.
Howes, Timothy A. et al., "Understanding And Deploying LDAP Directory Services," Netscape Communications Corporation, pp. 2 cover pages, 102-105, 277-292 and 699-723, 1999.
Janis, Reference Monitor-Creating Group Membership, IBM Technical Disclosure Bulletin, p. 431, Mar. 1990.
Kim, Hahnsang et al., "Improving Cross-domain Authentication over Wirsless Local Area Networks," Security and Privacy for Emerging Areas in Communications Networks, 2005 (SecureComm 2005; First International Conference on Sep. 5-9, 2005 pp. 127-138.
Leon, Mark, "McAfee's NetTools Promises to Ease Network Desktop Diagnosis," InfoWorld, vol. 17, Issue 30, p. 53, Jul. 24, 1995.
Lin, Whe Dar et al., "A Wireless-based Authentication and Anonymous Channels for Large Scale Area," Computers and Communications, 2001; Proceedings; Sixth IEEE Symposium on Jul. 3-5, 2001; pp. 36-41.
Luciani, J. et al., "Server Cache Synchronization Protocol (SCSP)," RFC 2334, 39 pages, Apr. 1998.
Musthaler, Linda, "The Trouble With Help Desk Selection," Network World, vol. 12, Issue 8, pp. 35-39, Feb. 20, 1995.
Myers, M. et al., "X.509 Internet Public Key Infrastructure Online Certificate Status Protocol—OCSP," The Internet Society, 22 pages, Jun. 1999.
Netegrity Inc., "SiteMinder Agent Operations Guide," Version 4.0, pp. 1-174, 1997.
Netegrity Inc., "SiteMinder Deployment Guide," Version 4.0, pp. 1-314, 1997.
Netegrity Inc., "SiteMinder Developer's API Guide," Version 4.0, pp. 1-368, 1997.
Netegrity Inc., "SiteMinder Installation Guide," Version 4.0, pp. 1-280, 1997.
Netegrity Inc., "SiteMinder Policy Server Operations Guide," Version 4.0, pp. 1-556, 1997.
Netscape Communications Corporation, "Introduction to SSL," http://developer.netscape.com/docs/manuals/security/sslin/contents.htm, 12 pages, Oct. 9, 1998.
Oblix, Inc., "Oblix CSA Solution Administration Guide," Version 3.5, 328 pages, 1999.
Park, Joon S. et al., "Secure Cookies on the Web," IEEE Internet Computing, pp. 36-44, Jul./Aug. 2002.
Pfitzmann, Birgit et al., "Analysis Of Liberty Single-Sign-On With Enabled Clients," IEEE Internet Computing, pp. 38-44, Nov./Dec. 2003.
Phipatanasuphorn, Veradej et al., "Vulnerability Of Sensor Networks to Unauthorized Traversal and Monitoring," IEEE Transactions on Computers, vol. 53, No. 3, pp. 364-369, Mar. 2004.
Piscitello, David M. et al., "Project Guards Laptop and Desktop Data," InfoWorld, pp. 48 and 54, Jun. 21, 1999.
Schmersal, Frank, "Testing to Maintain Service Standards," Communications News, vol. 35, Issue 3, pp. 22-23, Mar. 1998.
Securant Technologies, Inc., "Clear Trust, Unified Access Management," pp. 1-23, 1997.
Skaggs, B. et al., "Network Vulnerability Analysis," IEEE, pp. III-493-III-495, 2002.
Stokes, E. et al., "Access Control Requirements for LDAP," RFC 2820, 9 pages, May 2000.
Sun Microsystems, Inc., "Appendix B—ACL File Syntax," iPlanet Web Server: FastTrack Edition Administrator's Guide, 7 pages, Jul. 13, 2000.
Sun Microsystems, Inc., "Chapter 2—Syntax and Use of obj.conf," iPlanet Web Server, FastTrack Edition NSAPI Programmer's Guide, 16 pages, Jul. 20, 2000.
Sun Microsystems, Inc., "Chapter 12—Controlling Access to Your Server," iPlanet Web Server: FastTrack Edition Administrator's Guide, 24 pages, Jul. 13, 2000.
U.S. Appl. No. 09/792,911, Office Action dated Sep. 9, 2004, 18 pages.
U.S. Appl. No. 09/792,911, Final Office Action dated May 9, 2005, 17 pages.
U.S. Appl. No. 09/792,911, Advisory Action dated Aug. 9, 2005, 3 pages.
U.S. Appl. No. 09/792,911, Office Action dated Dec. 2, 2005, 13 pages.
U.S. Appl. No. 09/792,915, Office Action dated Jul. 23, 2004, 17 pages.
U.S. Appl. No. 09/792,915, Final Office Action dated Mar. 8, 2005, 19 pages.
U.S. Appl. No. 09/792,915, Final Office Action dated Jun. 30, 2005, 18 pages.
U.S. Appl. No. 09/792,915, Office Action dated Oct. 4, 2005, 17 pages.

U.S. Appl. No. 09/792,918, Office Action dated Sep. 8, 2004, 22 pages.
U.S. Appl. No. 09/792,918, Final Office Action dated Jun. 21, 2005, 16 pages.
U.S. Appl. No. 09/792,918, Advisory Action dated Sep. 20, 2005, 3 pages.
U.S. Appl. No. 09/792,934, Office Action dated Sep. 21, 2004, 19 pages.
U.S. Appl. No. 09/792,934, Final Office Action dated Jun. 2, 2005, 10 pages.
U.S. Appl. No. 09/792,934, Office Action dated Aug. 19, 2005, 5 pages.
U.S. Appl. No. 09/793,196, Office Action dated Jul. 14, 2004, 19 pages.
U.S. Appl. No. 09/793,196, Final Office Action dated Mar. 8, 2005, 15 pages.
U.S. Appl. No. 09/793,196, Advisory Action dated Jul. 21, 2005, 3 pages.
U.S. Appl. No. 09/793,196, Office Action dated Dec. 13, 2005, 12 pages.
U.S. Appl. No. 09/793,196, Final Office Action dated May 31, 2006, 22 pages.
U.S. Appl. No. 09/793,320, Office Action dated Aug. 4, 2004, 18 pages.
U.S. Appl. No. 09/793,320, Final Office Action dated May 10, 2005, 19 pages.
U.S. Appl. No. 09/793,320, Office Action dated Sep. 20, 2005, 15 pages.
U.S. Appl. No. 09/793,320, Final Office Action dated Mar. 17, 2006, 18 pages.
U.S. Appl. No. 09/793,354, Office Action dated Oct. 1, 2003, 12 pages.
U.S. Appl. No. 09/793,354, Final Office Action dated Apr. 19, 2004, 15 pages.
U.S. Appl. No. 09/793,354, Office Action dated Jan. 4, 2005, 11 pages.
U.S. Appl. No. 09/793,354, Final Office Action dated Aug. 26, 2005, 9 pages.
U.S. Appl. No. 09/793,354, Advisory Action dated Dec. 15, 2005, 3 pages.
U.S. Appl. No. 09/793,355, Office Action dated Mar. 12, 2004, 13 pages.
U.S. Appl. No. 09/793,355, Final Office Action dated Apr. 6, 2005, 16 pages.
U.S. Appl. No. 09/793,355, Advisory Action dated Jun. 21, 2005, 7 pages.
U.S. Appl. No. 09/793,355, Office Action dated Sep. 7, 2005, 13 pages.
U.S. Appl. No. 09/793,658, Office Action dated Sep. 9, 2004, 14 pages.
U.S. Appl. No. 09/793,658, Final Office Action dated Nov. 2, 2005, 16 pages.
U.S. Appl. No. 09/793,658, Advisory Action dated Jan. 31, 2006, 3 pages.
U.S. Appl. No. 09/814,091, Office Action dated Jul. 14, 2004, 22 pages.
U.S. Appl. No. 09/814,091, Final Office Action dated Apr. 8, 2005, 24 pages.
U.S. Appl. No. 09/814,091, Advisory Action dated Jul. 5, 2005, 3 pages.
U.S. Appl. No. 09/814,091, Office Action dated Nov. 1, 2005, 18 pages.
U.S. Appl. No. 09/814,091, Office Action dated May 3, 2006, 7 pages.
U.S. Appl. No. 09/886,515, Office Action dated Dec. 28, 2004, 35 pages.
U.S. Appl. No. 09/886,515, Office Action dated Aug. 29, 2005, 35 pages.
U.S. Appl. No. 09/886,515, Final Office Action dated Feb. 14, 2006, 36 pages.
U.S. Appl. No. 09/997,408, Office Action dated Sep. 7, 2005, 11 pages.
U.S. Appl. No. 09/997,408, Final Office Action dated Feb. 15, 2006, 7 pages.
U.S. Appl. No. 09/997,409, Office Action dated Jun. 3, 2005, 17 pages.
U.S. Appl. No. 09/997,409, Office Action dated Nov. 7, 2005, 12 pages.
U.S. Appl. No. 09/997,409, Office Action dated May 3, 2006, 9 pages.
U.S. Appl. No. 09/998,893, Office Action dated Jun. 13, 2005, 20 pages.
U.S. Appl. No. 09/998,893, Final Office Action dated Dec. 28, 2005, 12 pages.
U.S. Appl. No. 09/998,895, Office Action dated Mar. 25, 2005, 18 pages.
U.S. Appl. No. 09/998,895, Final Office Action dated Aug. 1, 2005, 19 pages.
U.S. Appl. No. 09/998,895, Advisory Action dated Oct. 20, 2005, 3 pages.
U.S. Appl. No. 09/998,895, Office Action dated Feb. 7, 2006, 13 pages.
U.S. Appl. No. 09/998,898, Office Action dated Sep. 21, 2005, 13 pages.
U.S. Appl. No. 09/998,898, Office Action dated Mar., 28, 2006, 7 pages.
U.S. Appl. No. 09/998,908, Office Action dated Jan. 25, 2005, 24 pages.
U.S. Appl. No. 09/998,908, Final Office Action dated Aug. 22, 2005, 14 pages.
U.S. Appl. No. 09/998,908, Advisory Action dated Nov. 1, 2005, 3 pages.
U.S. Appl. No. 09/998,908, Office Action dated Feb. 16, 2006, 15 pages.
U.S. Appl. No. 09/998,910, Office Action dated Jan. 28, 2005, 12 pages.
U.S. Appl. No. 09/998,910, Office Action dated Dec. 13, 2005, 10 pages.
U.S. Appl. No. 09/998,914, Office Action dated Jul. 14, 2005, 19 pages.
U.S. Appl. No. 09/998,914, Final Office Action dated Jan. 30, 2006, 15 pages.
U.S. Appl. No. 09/998,915, Office Action dated Sep. 21, 2005, 24 pages.
U.S. Appl. No. 09/998,915, Final Office Action dated Mar. 13, 2006, 29 pages.
U.S. Appl. No. 09/998,916, Office Action dated Mar. 21, 2005, 16 pages.
U.S. Appl. No. 09/998,916, Final Office Action dated Sep. 8, 2005, 12 pages.
U.S. Appl. No. 09/998,916, Advisory Action dated Dec. 9, 2005, 4 pages.
U.S. Appl. No. 09/998,916, Advisory Action dated Apr. 5, 2006, 11 pages.
U.S. Appl. No. 09/998,926, Office Action dated Aug. 25, 2005, 26 pages.
U.S. Appl. No. 09/998,926, Final Office Action dated Feb. 27, 2006, 15 pages.
U.S. Appl. No. 09/999,074, Office Action dated Mar. 24, 2005, 24 pages.
U.S. Appl. No. 09/999,074, Final Office Action dated Sep. 20, 2005, 19 pages.
U.S. Appl. No. 09/999,074, Advisory Action dated Dec. 20, 2005, 3 pages.
U.S. Appl. No. 09/999,177, Office Action dated Mar. 25, 2005, 23 pages.
U.S. Appl. No. 09/999,177, Final Office Action dated Sep. 14, 2005, 26 pages.
U.S. Appl. No. 09/999,177, Advisory Action dated Dec. 14, 2005, 6 pages.
U.S. Appl. No. 10/145,684, Office Action dated Jun. 16, 2005, 17 pages.
U.S. Appl. No. 10/145,684, Final Office Action dated Dec. 1, 2005, 10 pages.

U.S. Appl. No. 10/145,684, Advisory Action dated Mar. 9, 2006, 3 pages.
U.S. Appl. No. 10/145,684, Office Action dated Jun. 30, 2006, 25 pages.
U.S. Appl. No. 10/146,150, Office Action dated Jul. 27, 2005, 17 pages.
U.S. Appl. No. 10/146,150, Final Office Action dated Dec. 20, 2005, 12 pages.
U.S. Appl. No. 10/146,150, Advisory Action dated Mar. 13, 2006, 4 pages.
U.S. Appl. No. 10/146,150, Office Action dated May 30, 2006, 18 pages.
Wahl, M. et al., "Authentication Methods for LDAP," RFC 2829, 16 pages, May 2000.
Wahl, M. et al., "Lightweight Directory Access Protocol (v3)," RFC 2251, 48 pages, Dec. 1997.
Walsh, Jeff, "Remedy Releases Three Applications for Help-Desk Suite," InfoWorld, vol. 19, Issue 16, p. 34, Apr. 21, 1997.
Yaacovi, Y. et al., "Lightweight Directory Access Protocol (v3): Extensions for Dynamic Directory Services," RFC 2589, 12 pages, May 1999.
Wu, Kun-Lung et al., "Personalization With Dynamic Profiler," IEEE, pp. 12-20, 2001.
U.S. Appl. No. 09/998,915, Advisory Action dated Jul. 17, 2006, 3 pages.

* cited by examiner

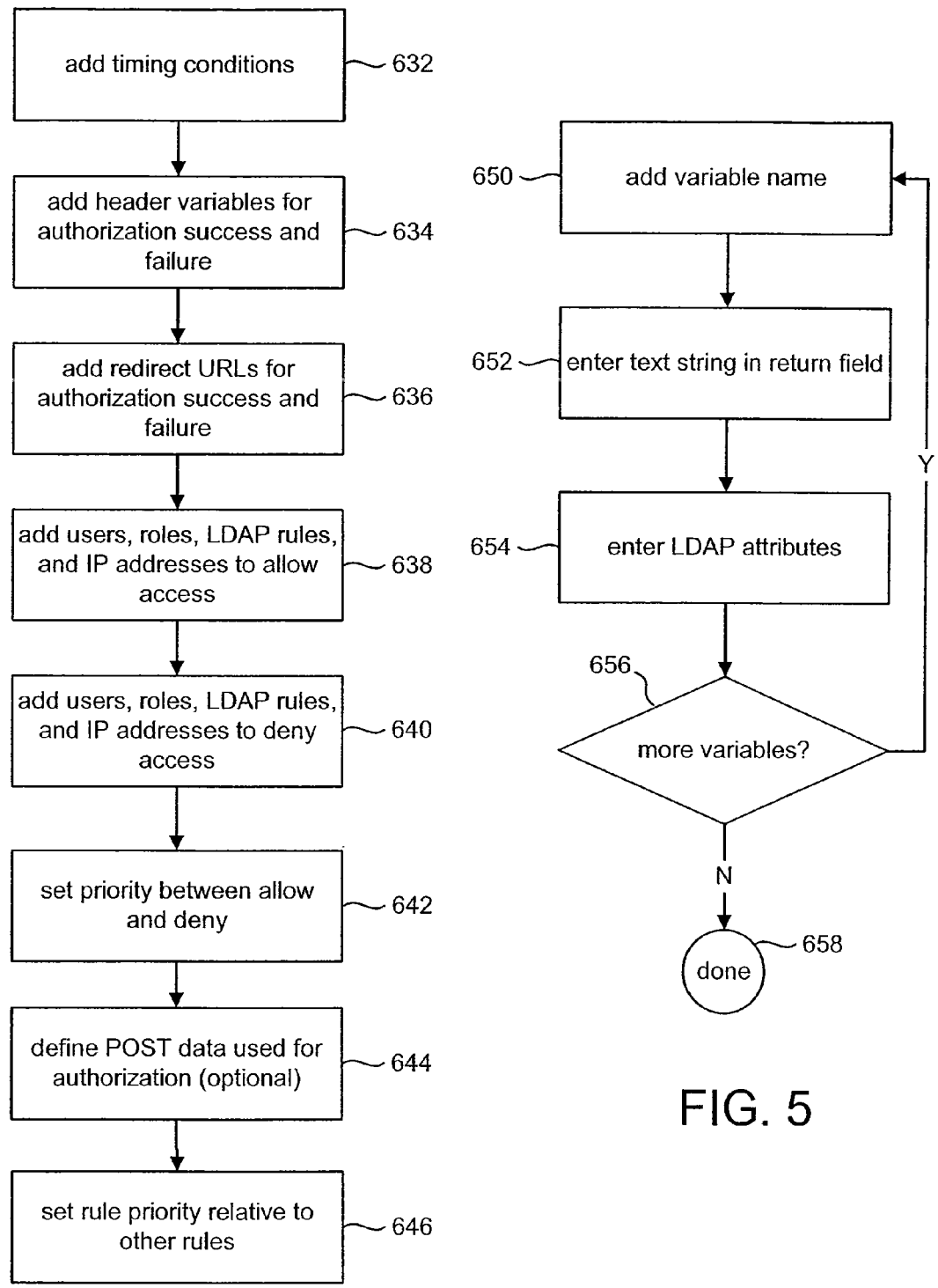

IMPERSONATION IN AN ACCESS SYSTEM

CROSS-REFERENCE TO RELATED APPLICATIONS

The present application is a Continuation of U.S. patent application Ser. No. 09/998,915, filed Nov. 30, 2001 and entitled IMPERSONATION IN AN ACCESS SYSTEM, the entire disclosure of which is incorporated herein by reference for all purposes.

This Application is related to U.S. patent application Ser. No. 09/998,916 titled "Proxy System," by Joan C. Teng and Chi-Cheng Lee, filed on the same day as the present application, which is incorporated herein by reference.

BACKGROUND OF THE INVENTION

1. Field of the Invention

The present invention is directed to impersonating an entity in an access system.

2. Description of the Related Art

As the impact of the Internet continues to alter the economic landscape, companies are experiencing a fundamental shift in how they do business. Business processes involve complex interactions between companies and their customers, suppliers, partners, and employees. For example, businesses interact constantly with their customers—often other businesses—to provide information on product specification and availability. Businesses also interact with vendors and suppliers in placing orders and obtaining payments. Businesses must also make a wide array of information and services available to their employee populations, generating further interactions. To meet new challenges and leverage opportunities, while reducing their overall cost of interaction, many organizations are migrating to network-based business processes and models. One example is the Internet-based E-business model.

To effectively migrate their complex interactions to an Internet-based E-business environment, organizations must contend with a wide array of challenges and issues. For example, businesses need to securely provide access to business applications and content to users they deem authorized. To meet these challenges, E-business host companies have used web access management solutions to secure and manage all the various network based interactions. These systems will authenticate users attempting to access resources protected by the system, and selectively authorize the authenticated users to access one or more of the resources.

Use of prior and existing web access management solutions have given rise to customer service issues. For example, situations exist where entities attempting to access one or more resources protected by the web access management solution are not properly trained to use the web access management system. Therefore, they encounter trouble and are unable to effectively access the appropriate resources. Additionally, a web access management solution may have a bug or other issue that prevents a user from effectively accessing the requested resource. In those situations, as well as many other situations, users may attempt to contact a customer service representative for the entity providing the E-business interface. These customer service representatives need to troubleshoot, debug and verify end user experiences. However, current tools make it difficult for these customer service representatives to do such troubleshooting, debugging and verifying. At best, they can hypothesize about what the user is experiencing and make an educated guess as to a solution.

One attempt to provide a troubleshooting capability included editing functionality for each resource such that the resource will allow an administrator to be considered as a particular end user. The administrator will identify who that administrator is and which end user the administrator wishes to act as. The resource will then treat the administrator as that end user. Several problems have existed with the above described solution. One problem is that this solution requires every resource to be altered to include the additional functionality. One example of a resource is a software application. In some cases, there are many resources being protected and, therefore, the effort to alter each resource is too costly. Furthermore, as new resources are added into the system, those new resources will need to be altered to add the functionality. In some cases, the resources cannot be altered. For example, if a resource is purchased from a third party vendor, the source code may not be provided and, therefore, the resource cannot be altered to add the functionality. Another problem is that this solution is too burdensome on the administrator. That is, if the administrator wants to interact with multiple resources, the administrator may need to authenticate at each resource. In some cases, the administrator needs to know or alter the user's password to be able to perform the troubleshooting, which imposes security risks and privacy issues.

Therefore, there is a need to provide a new means to troubleshoot, debug and verify end user experiences on a network based system for accessing resources.

SUMMARY OF THE INVENTION

The present invention, roughly described, provides for a system that allows a first entity to impersonate a second entity. In one embodiment, the first entity can impersonate the second entity without knowing the second entity's password and/or without altering anything in the second entity's set of personal information. This invention provides administrators (or other entities) with the ability to troubleshoot problems in a live production system without disrupting users or the system.

One embodiment of the present invention includes a system for receiving authentication credentials for a first entity and an identification of a second entity. The system authenticates the first entity based on the received authentication credentials for the first entity. A cookie is created that stores an indication of the second entity if the step of authenticating was performed successfully. Finally, the first entity is authorized to access a resource. The step of authorizing the first entity's access to the resource is performed by treating the first entity as the second entity. That is, the first entity is impersonating the second entity such that it appears, to the resource being accessed, that it is being accessed by the second entity.

In one embodiment, the cookie described above is used to provide single sign-on capability. That is, once an entity authenticates, that entity is not required to re-authenticate if the entity attempts to access a second resource. During subsequent attempt to access different resources, the system will access the cookie and determine if the user has already been authenticated. If the user has already been authenticated, then the user will be authorized to access the second resource based on the identity of the entity being impersonated (the impersonates).

In various embodiments, the access system performing the steps of authentication and authorization protects a plurality of resources. Each of these resources is separate from the access system. Some embodiments allow for impersonation without the use of the above mentioned cookie.

Various embodiments of the present invention allow for an entity to impersonate an end user in order to gain access to the applications and services the end user has access for, and perform actions or functions on behalf of the end user. For example, somebody who works with an eProcurement application is on vacation and needs to have somebody else perform his/her functions with that eProcurement system while on vacation. Impersonatation with the present invention allows this to take place regardless of the application or resource for which the impersonation is taking place.

Another example is a bank (or other business) that wants to provide personalized services to its clients. More specifically, the bank wants the teller to use the teller's terminal in order to access the banking applications and learn things about the client's account that would allow this teller to give a more customized/personalized service. Impersonation allows the teller to gain access to the client's banking environment.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. The software can be used to program a processor that is part of a computing device. An exemplar computing device may include a processor, memory, disks, a network interface, a monitor, a printer, a keyboard, a pointing device and other peripheral devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the, following description in which the preferred embodiment of the invention has been set forth in conjunction with the drawings.

BRIEF DESCRIPTION OF THE DRAWINGS

FIG. 4 is a flow chart describing a process for adding an authorization rule.

FIG. 5 is a flow chart describing a process for adding header variables to an HTTP request.

DETAILED DESCRIPTION

Figure 1:
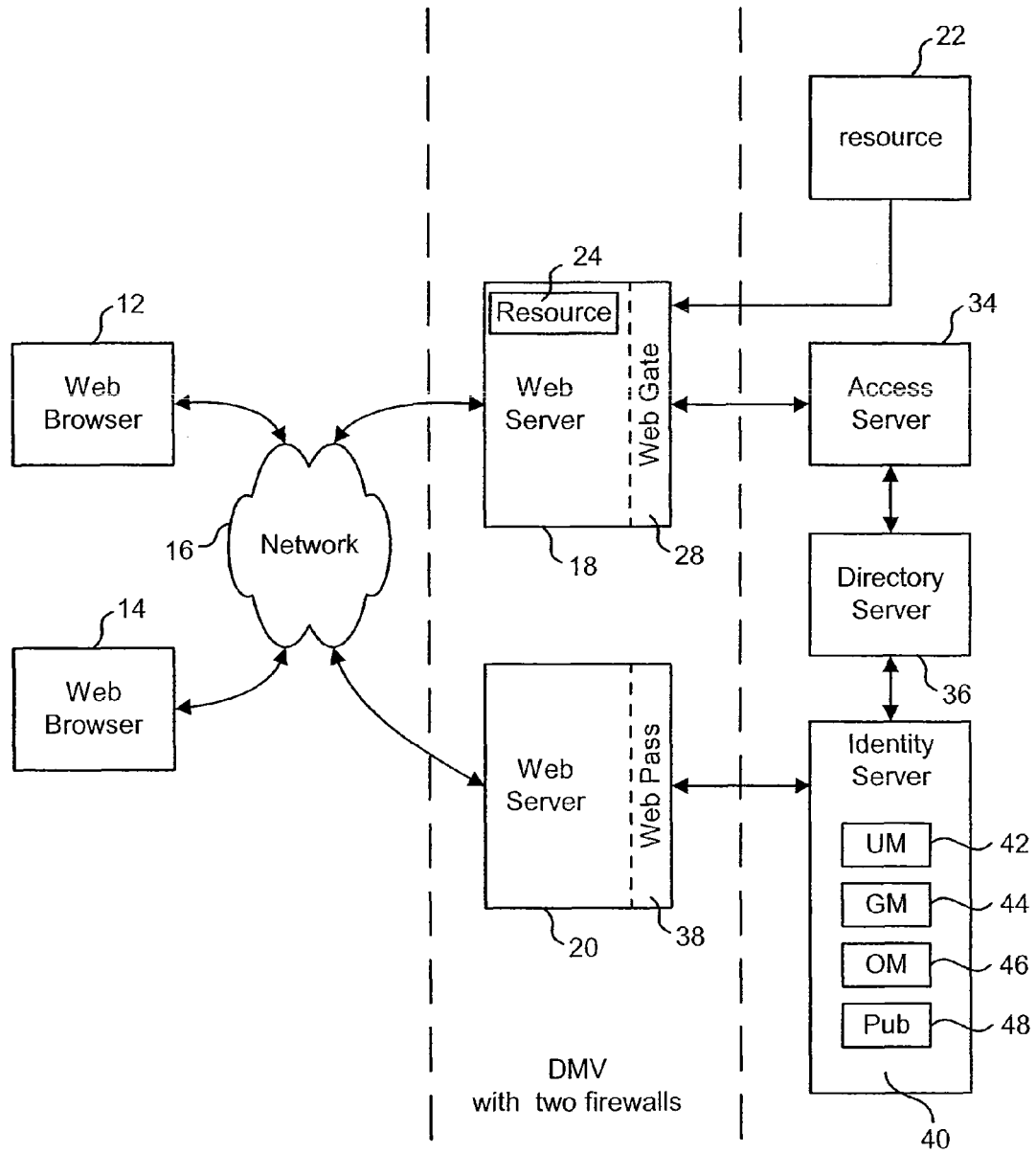
FIG. 1 is a block diagram depicting the components of one embodiment of the present invention.

FIG. 1 depicts an Access System, which provides identity management and/or access management for a network. The identity management portion of the system (hereinafter "the Identity Management System") manages identity profiles, while the access management portion of the system (hereinafter "the Access Management System") protects (e.g. provides security for) one or many resources across one or more web servers. A key feature of one embodiment of this system is the centralization of the repositories for policies and user identity profiles, while decentralizing their administration. That is, one embodiment of the system centralizes the policy and identity repositories by building them on directory service technology. The system decentralizes their administration by delegated Administrative roles. Although the system of FIG. 1 includes an Identity Management System and an Access Management System, other embodiments may only include an Access Management System.

FIG. 1 is a block diagram depicting one embodiment for deploying an Access System. FIG. 1 shows web browsers 12 and 14 accessing Web Server 18 and/or Web Server 20 via Internet (or other network) 16. In one embodiment, web browsers 12 and 14 are standard web browsers known in the art running on any suitable type of computer. FIG. 1 depicts web browsers 12 and 14 communicating with Web Server 24 and Web Server 20 using HTTP over the Internet; however, other protocols and networks can also be used.

Web Server 18 is a standard Web Server known in the art and provides an end user with access to various resources via Internet 16. In one embodiment, there is a first firewall (see dotted lines) connected between Internet 16 and Web Server 18, a second firewall (see dotted lines) connected between the Web Servers and Access Server 34/Identity Server 400.

FIG. 1 shows two types of resources: resource 22 and resource 24. Resource 22 is external to Web Server 18 but can be accessed through Web Server 18. Resource 24 is located on Web Server 18. Both resource 22 and 24 are separate from the Access System. A resource can be anything that is possible to address with a uniform resource locator (URL see RFC 1738). A resource can include a web page, software application, file, database, directory, a data unit, etc. In one embodiment, a resource is anything accessible to a user on a network. The network could be the Internet, a LAN, a WAN, or any other type of network. Table 1, below, provides examples of resources and at least a portion of their respective URL syntax:

| Resource | URL Encoding |
| --- | --- |
| Directory | /Sales/ |
| HTML Page | /Sales/Collateral/index.html |
| CGI Script with no query | /cgi-bin/testscript.cgi |
| CGI Script with query | /cgi_bin/testscript.cgi?button=on |
| Application | /apps/myapp.exe |

FIG. 1 shows Web Gate 28, which is a plug-in to Web Server 18. Web Gate 28 communicates with Access Server 34. Access Server 34 communicates with Directory Server 36.

The Access Management System includes Access Server 34, Web Gate 28, and Directory Server 36. Access Server 34 provides authentication, authorization, and auditing (logging) services. It further provides for identity profiles to be used across multiple domains and Web Servers from a single web-based authentication (sign-on). Web Gate 28 acts as an interface between Web Server 18 and Access Server 34. Web Gate 28 intercepts requests for resources, and authorizes them via Access Server 34. Access Server 34 is able to provide centralized authentication, authorization, and auditing services for resources hosted on or available to Web Server 18 and other Web Servers.

The Identity Management System includes Web Pass 38, Identity Server 40 and Directory Server 36. Identity Server 40 manages identity profiles. An identity profile is a set of information associated with a particular entity (e.g. user, group, organization, etc.). The data elements of the identity profile are called attributes. An attribute may include a name, value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for entire organizations.

Using the multi-step workflow engine, a company can tailor the functionality of each of these applications to its own operating processes. Having flexible administrative workflows for every step in user, group and organization management not only lowers e-business transaction costs, it also ensures consistent services and tight security across the entire distributed environment. Identity Server 40 also includes Publisher 48, which is an application, which enables entities to quickly locate and graphically view information stored in an LDAP directory (or other data store).

The Identity Management System's functionality is processed by Identity Server 40, which communicates with Web-Pass 38. In one embodiment, Web Pass 38 is a web server plug-in that sends information back and forth between Identity Server 40 and Web Server 20. The system also provides a Certificate Processing Server (not shown in FIG. 1) for managing digital certificates.

User Manager 42 handles the key functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes without restriction and have multiple processes for different kinds of users.

Multi-level delegation features also simplify individual user management. Companies can assign the responsibility for maintaining user identity data to the people closest to it. For example, individual users can be allowed to add themselves to the user directory by filling out customized forms, modify personal or professional information about themselves (such as addresses, personal preferences, or name changes), change a piece of information in their identity profiles that can determine their access rights, or allow someone else to log in as their temporary substitute while they are out of the office or on vacation.

Likewise, any number of delegated administrators (both inside and outside the company) can be given the authority to create and delete users in the user directory, approve a change a user has requested, and change the information about users to grant or revoke services. Any administrator can be delegated any degree of responsibility.

Group Manager 44 allows entities to identify groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources;

modification and adaptation of groups and their access privileges with minimal disruption to the directory server's underlying schema; efficient addition and deletion of users from established groups; and delegation of administrative responsibility for group membership and subscription requests and approvals. With Group Manager 44, companies can allow individual users to self-subscribe to and unsubscribe from groups, see the groups that they are eligible to join or have joined, and request subscription to groups that have access to the applications they need. Multi-step workflows can then define which users must obtain approval before being added to a group and which can be added instantly. Group Manager 44 also lets companies form dynamic groups specified by an LDAP filter.

The third application in the Identity System, Organization Manager 46, streamlines the management of large numbers of organizations within an e-business network—partners, suppliers, or even major internal organizations such as sales offices and business units. Certain infrastructure security and management operations are best handled—or can only be handled—at the highest organizational unit (OU) level rather than at the individual or group level. Like User Manager and Group Manager, this application relies on multi-step workflow and delegation capabilities.

Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The system of FIG. 1 can be used to protect a web site, network, Intranet, Extranet, etc. To understand how the system of FIG. 1 protects a web site (or other structure), it is important to understand the operation of unprotected web sites. In a typical unprotected web site, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory Server 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory Server 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory Server 36 for the appropriate authorization criteria for the requested resource. Access Server 34 retrieves the authorization criteria for the resource and, based on that authorization criteria, Access Server 34 answers Web Gate 28's authorization query. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy domain the policy belongs to are logically concatenated with the policy's URL pattern and the resulting overall patterns compared to the incoming URL. If there is a match, then the policy's various rules are evaluated to determine whether the request should be allowed or denied; if there is not a match, then default policy domain rules are used.

The system of FIG. 1 is scalable in that there can be many Web Servers, many Access Servers, and many Identity Servers. In one embodiment, Directory Server 36 is an LDAP Directory Server and communicates with other servers/modules using LDAP over SSL. In other embodiments, Directory Server 36 can implement other protocols or can be other types of data repositories (e.g. SQL, etc.). FIG. 1 shows Identity Server 40 communicating with directory server 36. The system can also support multiple directory servers (or other types of data stores).

The various components depicted in FIG. 1 can be implemented using general purposes, specialized, handheld, wireless, or other types of computing devices. These devices are likely to have one or more processing units, memory for storing software and data, hard disks, CD-ROMs, displays, keyboards/keypads, pointing devices, network interfaces, and other peripherals.

There are many ways for an entity to access and use the Access System. In one embodiment, the entity can access the Access Systems using a browser. In other embodiments, XML documents and API's can be used to access the system.

The basic unit of information stored in a directory is called entry or an identity profile, which a collection of information about an object. Often, the information in an identity profile describes some real-world object such as a person, but this is not required to by the model. A typical directory includes many identity profiles that correspond to people, departments, servers, printers, and other real-world objects in the organization served by the directory.

An identity profile is composed of a set of attributes, each of which describes one particular trait of the object. Each attribute has a type, one or more values, and associated access criteria. The type describes the kind of information contained in the attribute, and the value contains the actual data. An identity profile has a set of attribute types that are required and a set of attribute types that are allowed. For example, an identity profile describing a person is required to have a cn (common name) attribute and a sn (surname) attribute. A number of other attributes are allowed, but not required. One example of an allowed attribute may be a nickname. Any other attribute type not explicitly required or allowed is prohibited. The collections of all information about required and allowed attributes are called the directory schemas.

Example of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in an organization identity profile include: owner, name, description, business category, address, country, etc. In other embodiments, less or more than the above-listed information is stored.

Figure 2:
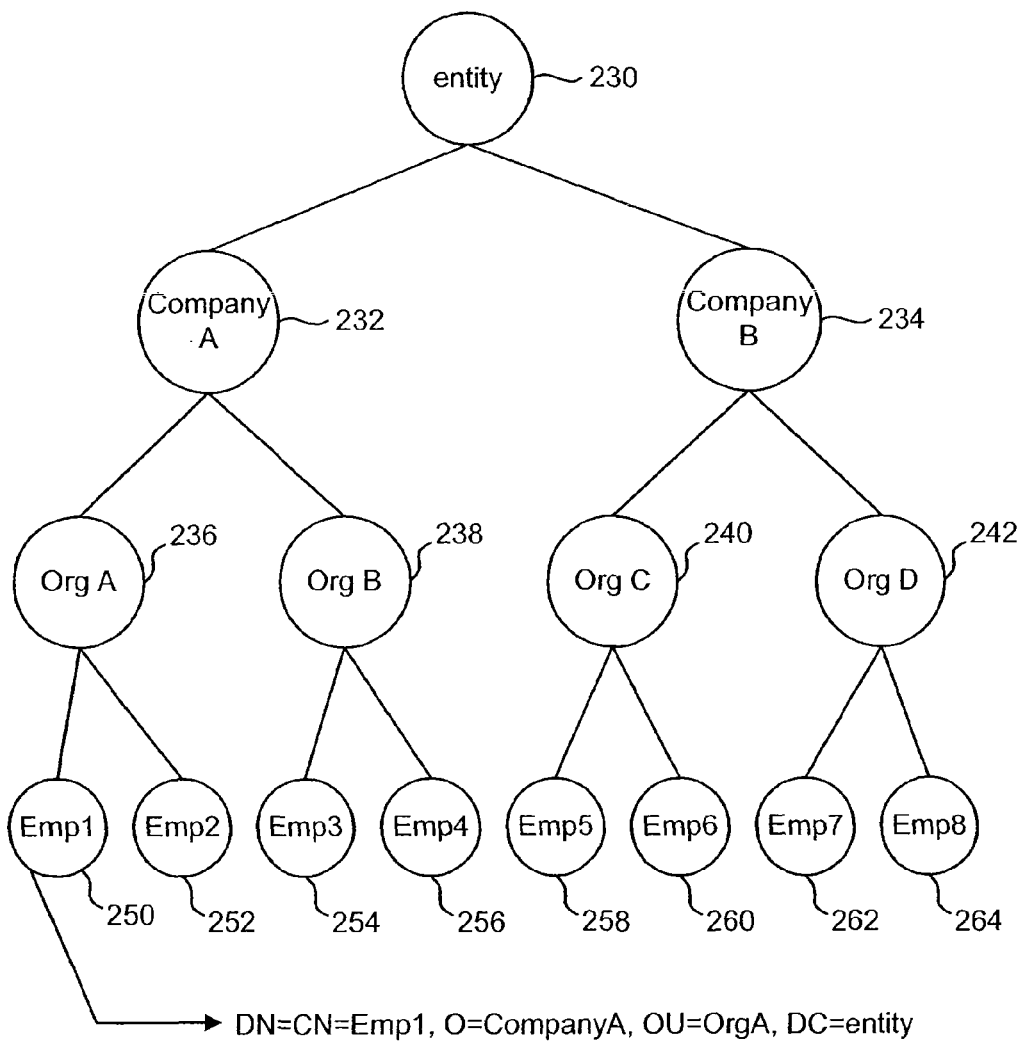
FIG. 2 is a block diagram depicting an example of a directory tree structure.

FIG. 2 depicts an exemplar directory tree that can be stored on Directory Server 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 2 shows company A broken up into two organizations: organization A with node 236 and organization B with node 238. Company B is shown to be broken up into two organizations: organization C with node 240 and organization D with node 242. FIG. 2 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names along the tree up to the top entity. For example, the distinguished name of employee 1 (node 250) is DN=CN=Empl, ,O=CompanyA, OU=OrgA, DC=entity, where:
DC=Domain Component
O=Organization
OU=Organization Unit
CN=common name.

FIG. 2 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis and on a write by write basis within the attribute.

Figure 3:
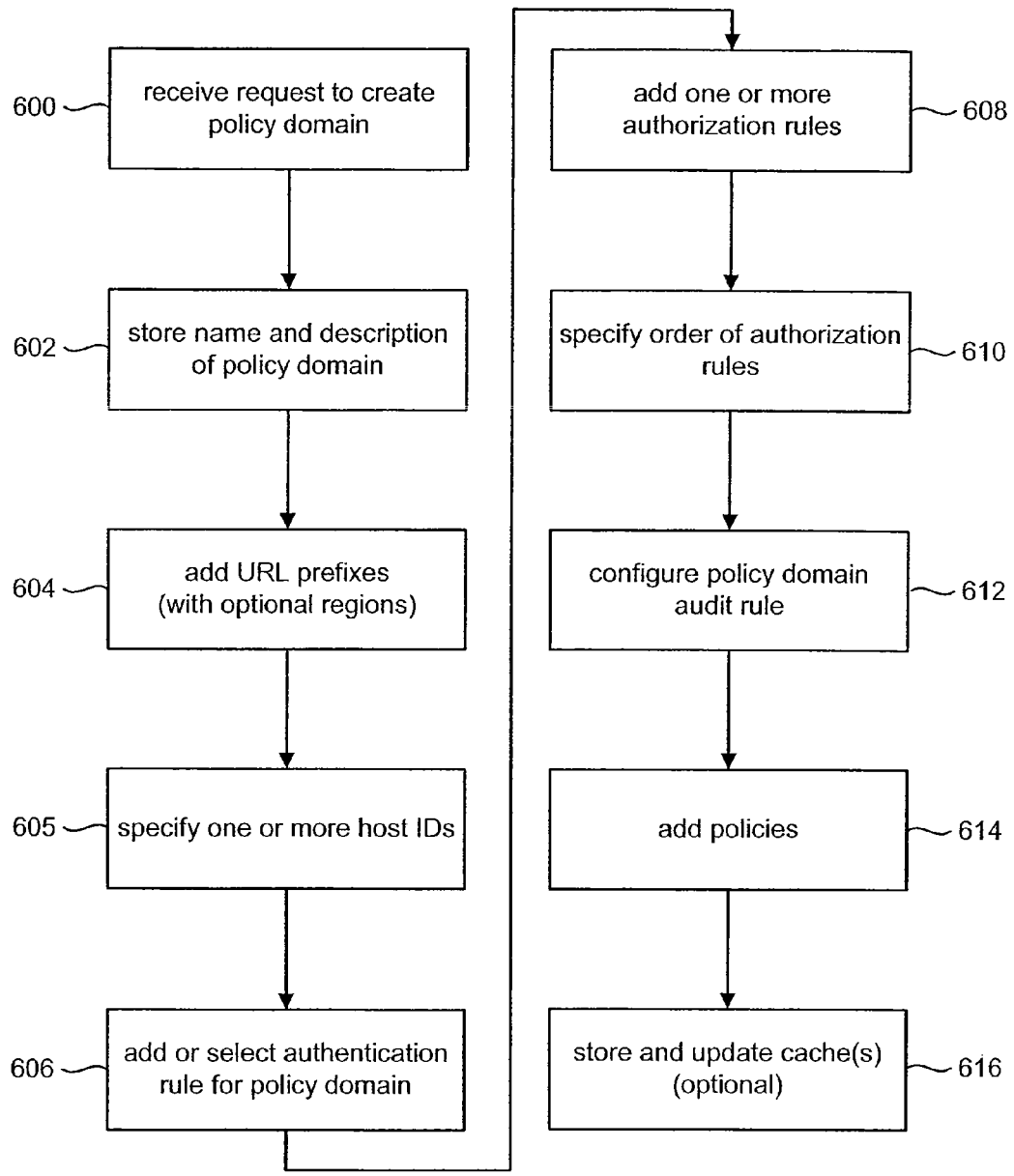
FIG. 3 is a flow chart describing a process for creating a policy domain.

FIG. 3 is a flow chart, which describes the process of creating a policy domain. In step 600, a request is received to create a policy domain. In step 602, the name of the policy domain and the description of the policy name are stored. In step 604, one or more URL prefixes are added to the policy domain. In step 605, one or more host ID's are added to the policy domain (optional). Next, one or more access rules are added to the policy domain. An access rule is a rule about accessing a resource. Examples of access rules include authorization rules, authentication rules, auditing rules, and other rules which are used during the process, or attempting to access a resource. In step 606, a first level (default) authentication rule is added to the policy domain. In general, authentication is the process of verifying the identity of the user. Authentication rules specify the challenge method by which end users requesting access to a resource in the policy domain must prove their identity (authentication). As previously discussed, first level (default) authentication rules apply to all resources in a policy domain, while second level authentication rules are associated with policies that apply to subsets of resources or specific resources in the policy domain. In one embodiment, there is only one default authentication rule for a policy domain. If an administrator desires an authentication rule to apply to only a specific resource in the policy domain, a separate policy for that specific resource having a second level (specific) authentication rule should be defined, as discussed below. After setting up the authentication rule in step 606, one or more first level or default authorization rules are added to the policy domain in step 608. In general, an authorization rule determines who can access a resource. The default authorization rule allows or denies users access to resources within its applicable policy domain. If multiple authorization rules are created, then they are evaluated in an order specified in step 610. In step 612, a first level (default) audit rule is configured for the policy domain. In step 614, zero or more policies are added to the policy domain. In step 616, the data for the policy domain is stored in Directory Server 36 and appropriate caches (optional) are updated. In one embodiment, an authorization rule or an authentication rule can be set up to always grant authentication without any challenge or verification or always grant authorization without any verification.

FIG. 4 is a flow chart describing the process of adding one or more authorization rules to a policy domain. In step 632, timing conditions are set up for the authorization rule. Timing conditions restrict the time when the authorization rule is in effect. For example, users can be allowed access to URLs in the policy domain only during business hours, Monday through Friday. In one embodiment, if timing conditions are not set, the authorization rule is always in effect. In steps 634 and 636, authorization actions are set up. Authorization actions personalize the end user's interaction with the Web Server. In step 634, header variables are provided for authorization success events and authorization failure events. This feature allows for the passing of header variables about the end user (or other information) to other web-enabled resources. Web-enabled applications can personalize the end user's interaction with the Web Server using these header variables. As a simple example, the actions could supply each application with the user's name. An application could then greet the user with the message "hello<user's name>" whenever the user logs on. Header variables are variables that are part of an HTTP request. If an authorization rule is set up with header variables as part of an authorization success action, then when a successful authorization occurs the HTTP request to the resource will include the header variables.

FIG. 5 is a flow chart that describes the process of adding header variables to an HTTP request. Header variables can be added during an authorization success event, authorization failure event, authentication success event or authentication failure event. In step 650, the variable name is entered. In step 652, a text string is entered. In step 654, one or more LDAP attributes are identified. In step 656, it is determined whether any more header variables will be added. If not, the method of FIG. 5 is done (step 658). If so, the method of FIG. 5 loops back to step 650.

The variable name entered in step 650 is a value that appears in the HTTP header that names the variable. The downstream resource using the header variable will search for the variable name. The string entered is data that can be used by the downstream resource. The LDAP attribute(s) can be one or more attributes from the requesting user's identity profile. Thus, in the simple authorization success example described above, the variable name field can include "authorization success," the return field can include "yes," and the attribute field can include the name attribute for the user in the user's identity profile. Any of the attributes from the user's identity profile can be selected as a header variable.

Looking back at FIG. 4, in step 636, a redirect URL can be added for an authorization success event and a redirect URL can be entered for an authorization failure event. Step 638 includes specifying which users are allowed to access the resource associated with the authorization rule. By default, users cannot access a resource until they are granted access rights to it. In one embodiment, there are at least four means for specifying who can access a resource. The first means is to explicitly name a set of users who can access the resource. A second means includes identifying user roles. The third means is to enter an LDAP rule that can be used to identify a set of users based on a combination of one or more attributes. A fourth means is to enter an IP address, which will allow users of computers having the specified IP address to access the resource. Step 640 is used to specify the users not allowed to access the resource associated with this rule. Identification of users, roles, LDAP rules, and IP addresses are entered in step 640 in the same manner as entered in step 638. It is possible that a particular user can be subject to both an allow access rule and a deny access rule. Step 642 is used to set a priority between such rules. Optional step 644 is used to define any POST data to be used for authorization if this feature is implemented. An HTTP POST request can include POST data in the body of the HTTP request. POST data can also be submitted in query string form. In optional step 644, an administrator defines which (if any) POST data is to be used for authorization purposes. Step 646 is used to set a priority of evaluation for the authorization rule relative to other authorization rules in a given policy. In one embodiment, if multiple authorization rules apply to a resource, this priority determines the order of evaluation.

Figure 6:
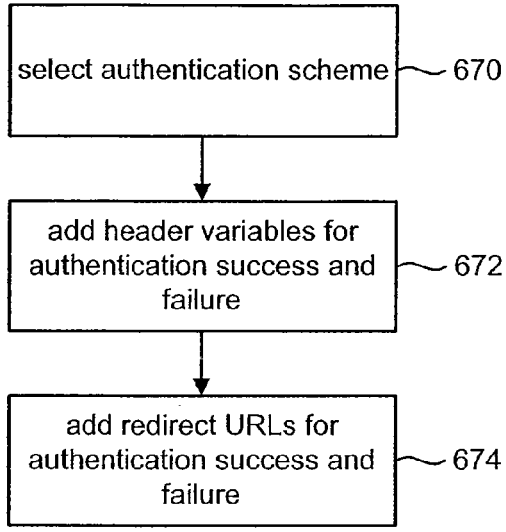
FIG. 6 is a flow chart describing a process for adding an authentication rule.

FIG. 6 is a flow chart describing the process for adding an authentication rule. In step 670, a challenge scheme (also called an authentication scheme) is selected. An authentication scheme is a method for requesting log-on information (e.g. ID and password) from end users trying to access a web resource. Within an authentication scheme is a challenge method (e.g. Basic, certificate or form). There can be more than one authentication scheme with the same challenge method (e.g. Basic over LDAP, Basic over NT Domain, . . .). Various other authentication schemes can also be used. In step 672, header variables are added for authentication success and authentication failure events. In step 674, redirect URLs are added for authentication success events and authentication failure events.

Figure 7:
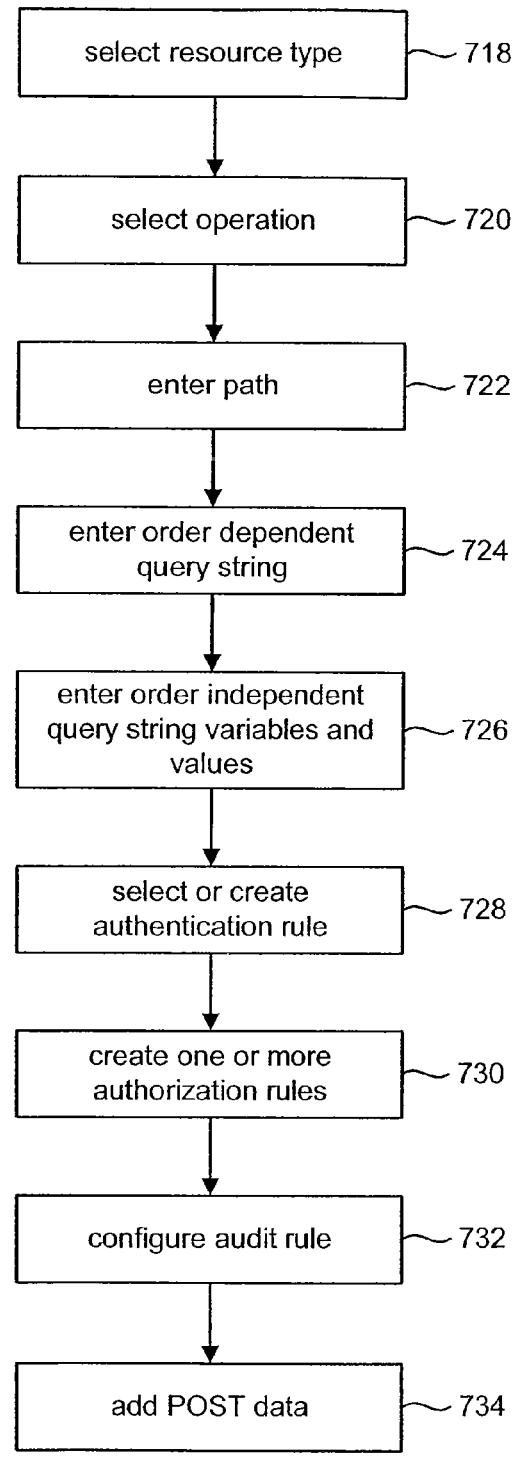
FIG. 7 is a flow chart describing a process for creating a policy.

FIG. 7 is a flow chart describing the process of adding a policy. In step 718, a resource type is specified. The resource type allows different resources to be handled by different policies, depending on the nature of the resource itself. For example, in one embodiment, the resource type will distinguish between resources accessed using HTTP and resources accessed using FTP. In another embodiment, Enterprise Java Beans (EJBs) are a possible resource type. In another embodiment, user-defined custom resource types are supported. In step 720, an operation type is specified. This allows different resources to be handled by different policies, depending on the operations used to request the resource. In one embodiment, the operations will be HTTP requests. Supported HTTP request methods include GET, POST, PUT, HEAD, DELETE, TRACE, OPTIONS, CONNECT, and OTHER. In another embodiment, if EJBs are identified as the resource type (step 718), an EXECUTE operation can be specified in step 720. In another embodiment, user-defined custom operations are supported. Other operations can also be supported. In step 722, a pattern for the URL path to which the policy applies is specified. This is the part of URL that does not include the protocol ("http") and host/domain ("www.oblix.com"), and appears before a '?' character in the URL. In step 724, a query string is specified. This is a set of variables and values that must be included in the specified order in an incoming URL for the policy to match and be activated. For example, in the URL "HTTP://www.zoo.com/animals.cgi?uid=maneaters&tigers=2" the values after the question mark (e.g. "uid=maneaters&tigers=2") comprise a query string. Only a URL exhibiting the query string can match to this policy. For example, a URL with the "tigers" variable appearing before the "uid" variable will not match the above-identified policy. In step 726, query string variables are added. Query string variables include a name of a variable and the variable's corresponding value. Query string variables are used when it is a desirable that multiple variables are found in the query string, but the order is unimportant. Thus, for a policy with query string variables "uid=maneaters" and "tigers=2," a URL with a query string having the appropriate uid and appropriate tigers variable, in any order, will match the policy. In order for a resource URL to apply to a policy, the path of the requested resource URL must match the path of the policy as well as any query string or query variables. As discussed above, POST data can be submitted in query string form (for example, in a form submission), and evaluated using the query string variables entered in step 726. The query string or query variables do not need to uniquely identify a resource. Rather, they are used to identify a policy, which may apply to one or more resources.

In step 728 of FIG. 7, an authentication rule is created. In step 730, one or more authorization rules are created for the policy. In step 732, an audit rule is configured for the policy. In step 734, POST data (optional) is added to the policy. This POST data is used to map resources with policies.

The present invention supports the use of multiple authentication schemes. An authentication scheme comprises an authentication level, a challenge method, an SSL assertion parameter, a challenge redirect parameter, and authentication plug-ins. The authentication level represents an arbitrary designation of the level of confidence that an administrator has in a particular authentication scheme relative to other authentication schemes.

In one embodiment of the present invention, an authentication scheme can specify one of four challenge methods: none, basic, form, and X.509. If an authentication scheme's challenge method is set to "none," no authentication is required to access a requested resource, thus allowing support for unauthenticated users. This challenge method can be used over both unsecured as well as SSL connections. The "basic" challenge method can also be used over both unsecured and SSL connections. The "X.509" challenge method can only be used over an SSL connection between a user's browser and Web Server host, because the authentication method invoked for an X.509 challenge method is part of the SSL protocol. A "form" challenge method employs a custom, site-specific HTML form presented to the user, who enters information and submits the form. Subsequent processing is determined by the administrator at the time the authentication scheme is created. Form challenge methods can be used over both unsecured and SSL connections.

The SSL parameter of an authentication scheme identifies whether SSL is to be asserted on the connection to the user's browser by the Web Server. The challenge parameter identifies where to redirect a request for authentication for the particular authentication scheme. In some embodiments, authentication plug-ins are necessary for processing the user's supplied information.

An authentication scheme that an attacker can easily and profitability eavesdrop upon is typically considered "weak." In one embodiment, the basic authentication challenge method places the user's credential (supplied information), a simple password, "in the clear" over an unsecured network connection. However, the authentication scheme can be made stronger by passing the user's credential over an encrypted connection, such as SSL.

When a user first requests a protected resource, the user is challenged according to the authentication scheme defined by the first level authentication rule in the applicable policy domain or the second level authentication rule in the applicable policy associated with the requested resource. If the user satisfies the authentication rule, an encrypted authentication cookie is passed to the user's browser indicating a successful authentication. Once authenticated, the user may request a second resource protected by a different policy domain and/or policy with a different authentication rule. The user will be allowed access to the second resource without re-authenticating if the authentication level of the authentication scheme used to successfully authenticate for the first resource is equal to or greater than the authentication level of the authentication scheme of the second resource. Otherwise, the user is challenged and asked to re-authenticate for the second resource in accordance with the second resource's higher level authentication scheme. Satisfaction of a higher or lower authentication level is determined by evaluating the authentication cookie sent by the user's browser when requesting the second resource. In one embodiment of the present invention, administrators can define an unlimited number of authentication levels.

Once authenticated, a user can explicitly log out, causing authentication cookies cached (or otherwise stored) by the user's browser to be destroyed or become invalid. Authentication cookies can also be set by an administrator to be destroyed after a maximum idle time has elapsed between requests to resources protected in accordance with the present invention.

Figure 8:
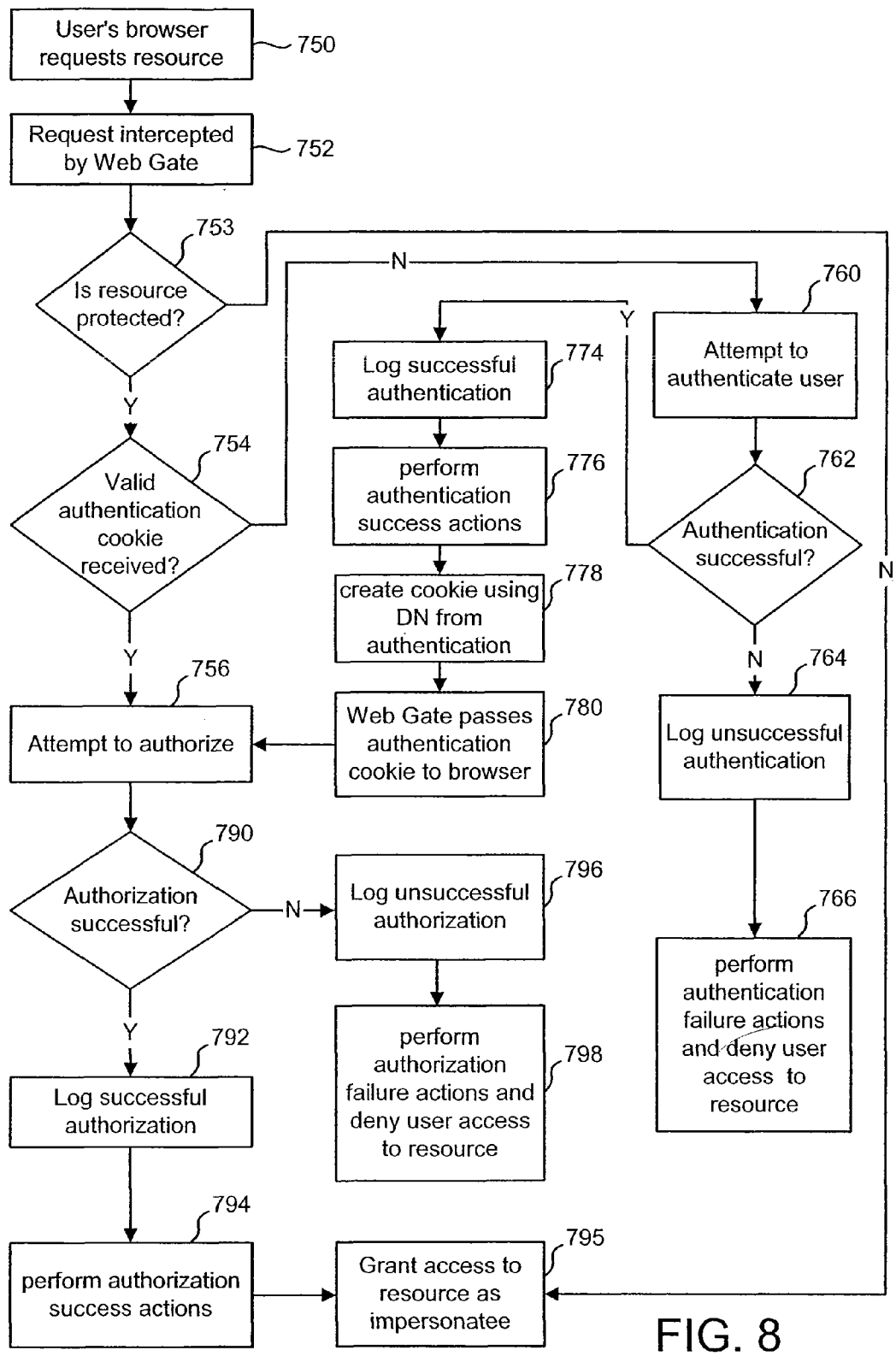
FIG. 8 is a flow chart describing an exemplar process performed by one embodiment of the present invention.

FIG. 8 provides a flow chart for one embodiment of a method for authenticating, authorizing, and logging. In step 750, a user's browser 12 requests a web-enabled resource 22 or 24. The request is intercepted by Web Gate 28 in step 752. The method then determines whether the requested resource is protected by an authentication and/or authorization rule in step 753. If the resource is not protected, then access is granted to the requested resource in step 795. If the requested resource is protected (e.g. the URL maps to a policy domain), then the method proceeds to step 754. If the user has previously authenticated for a protected resource in the same domain, a valid authentication cookie will be passed by browser 12 with the request in step 750 and intercepted by Web Gate in step 752. If a valid cookie is received (step 754), the method attempts to authorize the user in step 756. If no valid authorization cookie is received (step 754), then the method attempts to authenticate the user for the requested resource (step 760).

If the user successfully authenticates for the requested resource (step 762), then the method proceeds to step 774. Otherwise, the unsuccessful authentication is logged in step 764. After step 764, the system then performs authentication failure actions and Web Gate 28 denies the user access to the requested resource in step 766. In step 774, the successful authentication of the user for the resource is logged. The method then performs authentication success actions in step 766. In step 778, an authentication cookie is created. In one embodiment, the cookie includes the distinguished name of the authenticated user received from the authentication process. In the instance where user A is trying to impersonate user B, the distinguished name (or other identification) for user B will be stored in the cookie. Web Gate 28 then passes a valid authentication cookie to browser 12 in step 780, which is stored by browser 12. After passing the cookie in step 780, the system attempts to authorize in step 756.

In step 756, the method attempts to determine whether the user is authorized to access the requested resource. In many cases, authorization is performed based on the identity profile associated with the distinguished name stored in the authentication cookie. Therefore, when impersonating, authorization is based on the identity profile of the user being impersonated, not on the basis of the identity profile of the user doing the impersonation. If the user is authorized (step 790), the method proceeds to step 792. Otherwise, the unsuccessful authorization is logged in step 796. After step 796, the method performs authorization failure actions (step 798) and Web Gate 28 denies the user access to the requested resource. If authorization is successful (step 790), then the successful authorization of the user is logged in step 792, authorization success actions are performed in step 794, and the user is granted access to the requested resource in step 795. If user A is impersonating user B, then in step 795, user A is granted access to the resource as user B. That is, the Access System and the resource treat the user as user B and use user B's identity profile. In one embodiment of step 795, some or all of the HTTP request information is provided to the resource.

FIG. 8 contemplates a user requesting a resource and that request being intercepted. One alternative is that a log-in page is made available directly to users. Instead of requesting a resource, the user can request the log-in page. This log-in page can include a form to enter the user's ID and password. There can also be fields to enter the ID for the user to be impersonated and the resource requested. Alternatively, there can be a separate page, provided after authentication, to indicate the resource desired. In another alternative, after authentication the user will simply point the browser at the desired resource.

Figure 9:
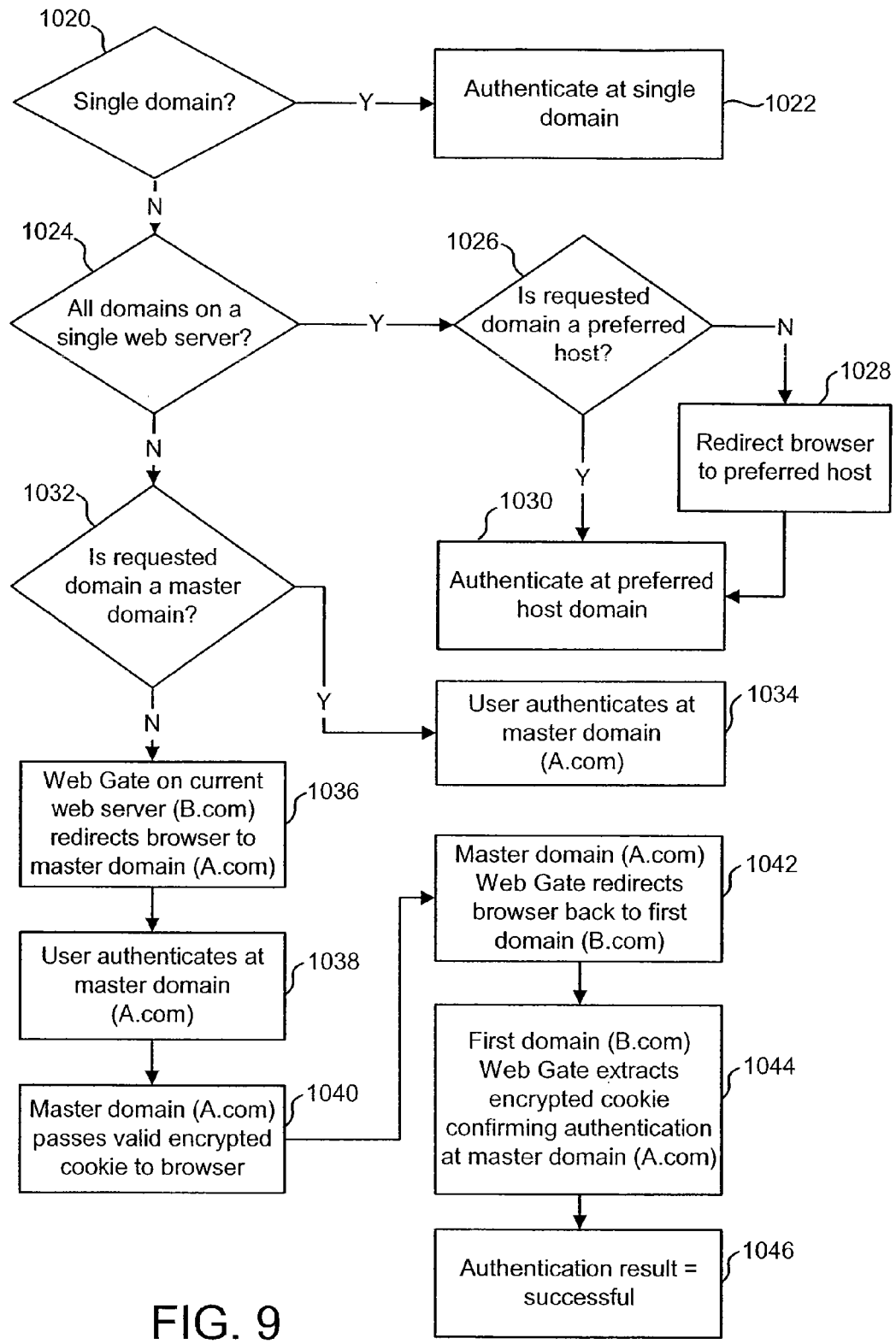
FIG. 9 is a flow chart describing one embodiment of a process for authentication.

FIG. 9 provides a flowchart of a method for authenticating a user for various combinations of domains and Web Servers through a single authentication performed by the user. As will be apparent to those skilled in the art, an Internet domain can reside on a single Web Server, or be distributed across multiple Web Servers. In addition, multiple Internet domains can reside on a single Web Server, or can be distributed across multiple Web Servers. In accordance with the present invention, the method of FIG. 9 allows a user to satisfy the authentication requirements of a plurality of domains and/or Web Servers by performing a single authentication.

In the simplest case, all of an e-business host company's Web Servers will be in the same domain (i.e. oblix.com). When a user successfully authenticates at one of the Web Servers, the Web Gate running on the authenticating Web Server causes the Web Server to return an encrypted cookie, indicating a successful authentication. Subsequent requests by the browser to the domain will pass this cookie, proving the user's identity; therefore, further authentications are unnecessary.

In a more complex case, an e-business host company's web presence incorporates associated web sites whose Web Servers have names in multiple domains. In such a multiple domain case, each of the associated portal Web Servers use a Web Gate plug-in configured to redirect user authentication exchanges to the e-business host's designated web log-in Web Server. The user is then authenticated at the e-business host's web log-in server, and an encrypted cookie is issued for the e-business host's domain to the user's browser. The user's browser is then redirected back to the original associated portal's site where the Web Gate creates a new cookie for the associated portal's domain and returns it to the user's browser.

As a result, the user is transparently authenticated in both the original associated portal's domain and the e-business host's domain. The process is transparently performed for each different associated portal that a user may visit during a session. The present invention's associated portal support easily supports single Web Servers having multiple DNS names in multiple domains, and/or multiple network addresses. In accordance with the present invention, this multiple domain authentication enables "staging" of web sites. For example, a new edition of a web site can be deployed on a separate set of servers, and then mapped to policy domains protected by the present invention by simply updating the policy domain's host ID's.

In step 1020 of FIG. 9, the system determines whether single or multiple domains are protected in a given deployment of the present invention. If only a single domain is protected, then the method proceeds to step 1022 where an authentication is attempted at the single domain. If the single domain is distributed across multiple Web Servers, then the domain attribute of the cookie set by the authenticating Web Server in step 1022 is set to broadly include all Web Servers in the domain.

If multiple domains are protected, the method proceeds to step 1024 determines whether the multiple protected domains all reside on a single Web Server. For example, a single machine intranet.oblix.com may be addressed in multiple ways such as: sifl.oblix.com, intranet, asterix.oblix.com, or 192.168.70.1. In accordance with the present invention, when multiple domains reside on a single Web Server, an administrator will designate exactly one of the domains a "preferred host domain." If step 1024 indicates that all protected domains reside on the same Web Server, then the system determines whether the domain of the requested resource is a preferred host (step 1026). If it is a preferred host, then the system attempts to authenticate the user at the preferred host domain in step 1030. Otherwise, browser 12 is re-directed to the preferred host domain (step 1028) for authentication (step 1030). Referring to step 1024, if the multiple protected domains reside on multiple Web Servers, then the method proceeds to step 1032.

In one embodiment, a single policy domain and/or policies are created for the preferred host domain while no policy domains or policies are created for the other domains residing on the same web server. All resource requests made to any of the multiple protected domains residing on the same web server are redirected to the preferred host domain, thus requiring the user to authenticate according to the preferred host domain's policy domain and/or policies. As a result, after authentication at the preferred host domain, the user is transparently authenticated for all other domains residing on the same web server. When subsequent resource requests for resources in domains residing on the same web server are redirected to the preferred host domain, the prior successful authentication for the host domain can be confirmed by the existence of a valid authentication cookie for the preferred host domain. If such a cookie exists, then the user need not re-authenticate for the requested resource. In one embodiment, if subsequent resource requests made to the preferred host domain (or any of the other domains on the same web server) require a higher level of authentication, or if a previously valid authentication has expired, the user will be required to re-authenticate at the preferred host domain.

Figure 10:
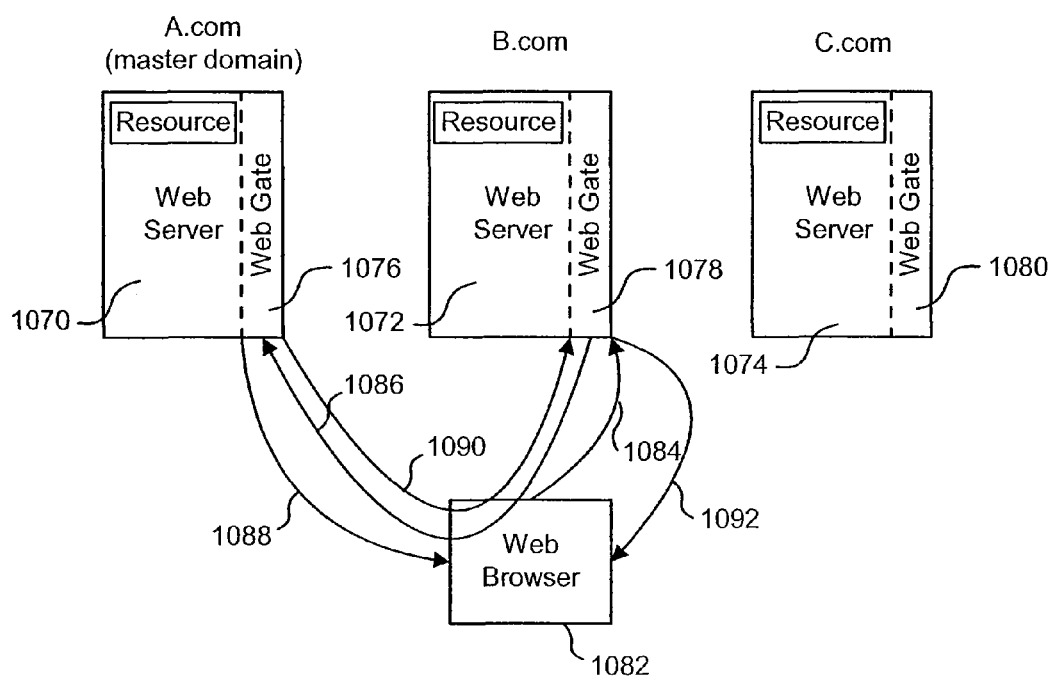
FIG. 10 is a block diagram depicting various components involved in one embodiment of the authentication process.

FIG. 10 provides a block diagram of a plurality of Web Servers, each hosting a different domain accessible by browser 1082. In accordance with the present invention, when multiple domains are protected and distributed across multiple Web Servers, the administrator will identify exactly one of the domains a "master domain." As identified in FIG. 10, Web Server 1070 hosts master domain A.com, while Web Servers 1072 and 1074 host domains B.com and C.com, respectfully. An end user's resource request is illustrated in FIG. 29 by path 1084 from browser 1082 to Web Server 1072.

Referring back to FIG. 9, if it is determined that the domain of the requested resource is a master domain (step 1032), then the system attempts to authenticate at the master domain (step 1034). Otherwise, Web Gate redirects browser 1082 to the master domain (step 1036). The user then authenticates at the master domain (step 1038). The redirection and authentication of steps 1036 and 1038 are illustrated in FIG. 10 by path 1086. Upon a successful authentication at the master domain, the master domain Web Server passes an authentication cookie to the user's browser (step 1040) and re-directs the user's browser back to the first domain accessed by the user (step 1042). Also in step 1042, the master domain passes information contained in the master domain authentication cookie to the first domain in the query data portion of the redirection URL. Steps 1040 and 1042 are illustrated by paths 1088 and 1090, respectively in FIG. 10. In step 1044, the Web Gate of the first domain Web Server extracts the master domain authentication cookie information from the redirection URL, thus confirming the user's authentication at the master domain and resulting in a successful authentication (step 1046). The first domain Web Server (B.com) then sends its own authentication cookie to web browser 1082 (as depicted by path 1092). Any subsequent authentication by browser 1082 at domain C.com on Web Server 1074 follows the method of FIG. 9.

Figure 11:
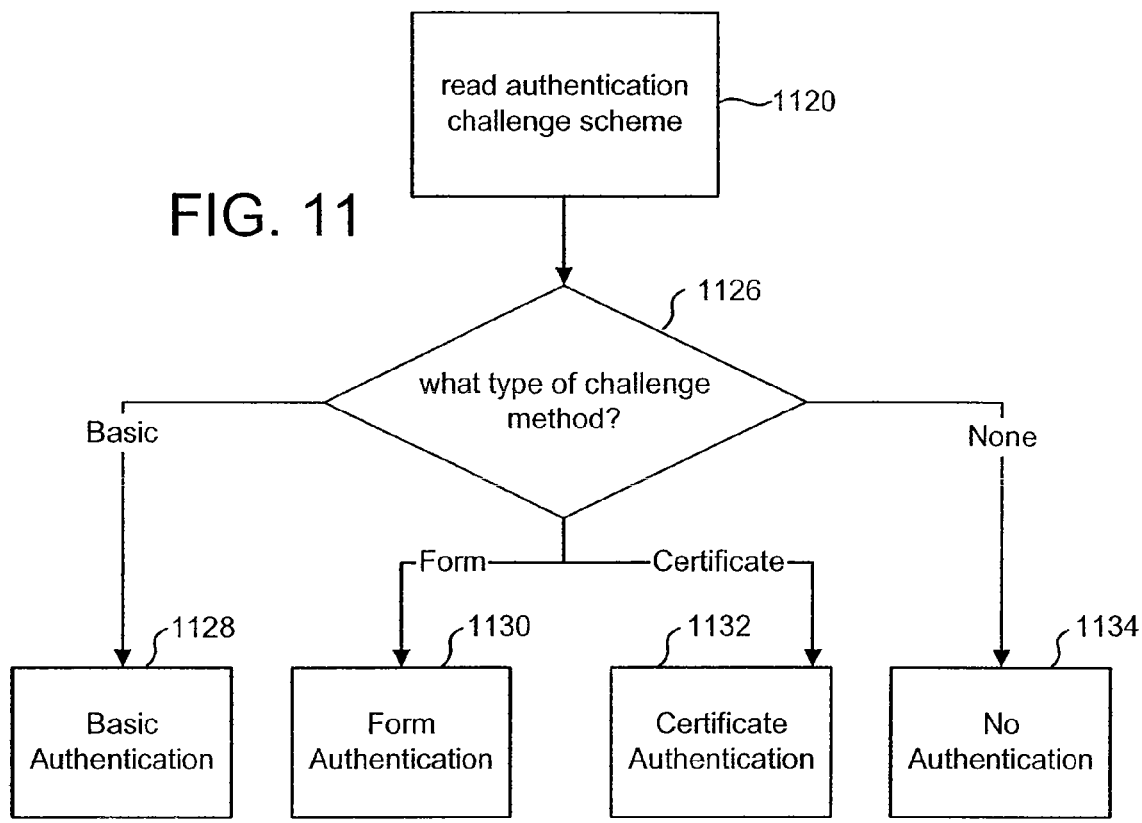
FIG. 11 is a flow chart describing a process for authentication.

FIG. 11 provides a flow chart of the method for authenticating, as performed in steps 1022, 1030, 1034, and 1038 of FIG. 9. In step 1120, the system accesses the authentication challenge method that is to be used for the given resource. This challenge method is stored in the directory, and can also be stored in a cache. In step 1126, the system discerns whether the authentication challenge scheme calls for basic, form, certificate, or no authentication. If the challenge scheme indicates basic authentication, then the method proceeds to step 1128 and performs basic authentication. If the challenge scheme indicates form authentication, then the method proceeds to step 1130 and performs form authentication. If the challenge scheme indicates certificate authentication, then the method proceeds to step 1132 and performs certificate authentication. If the challenge scheme indicates that no authentication is required (step 1134), then the user is not challenged, authentication is not performed.

Figure 12:
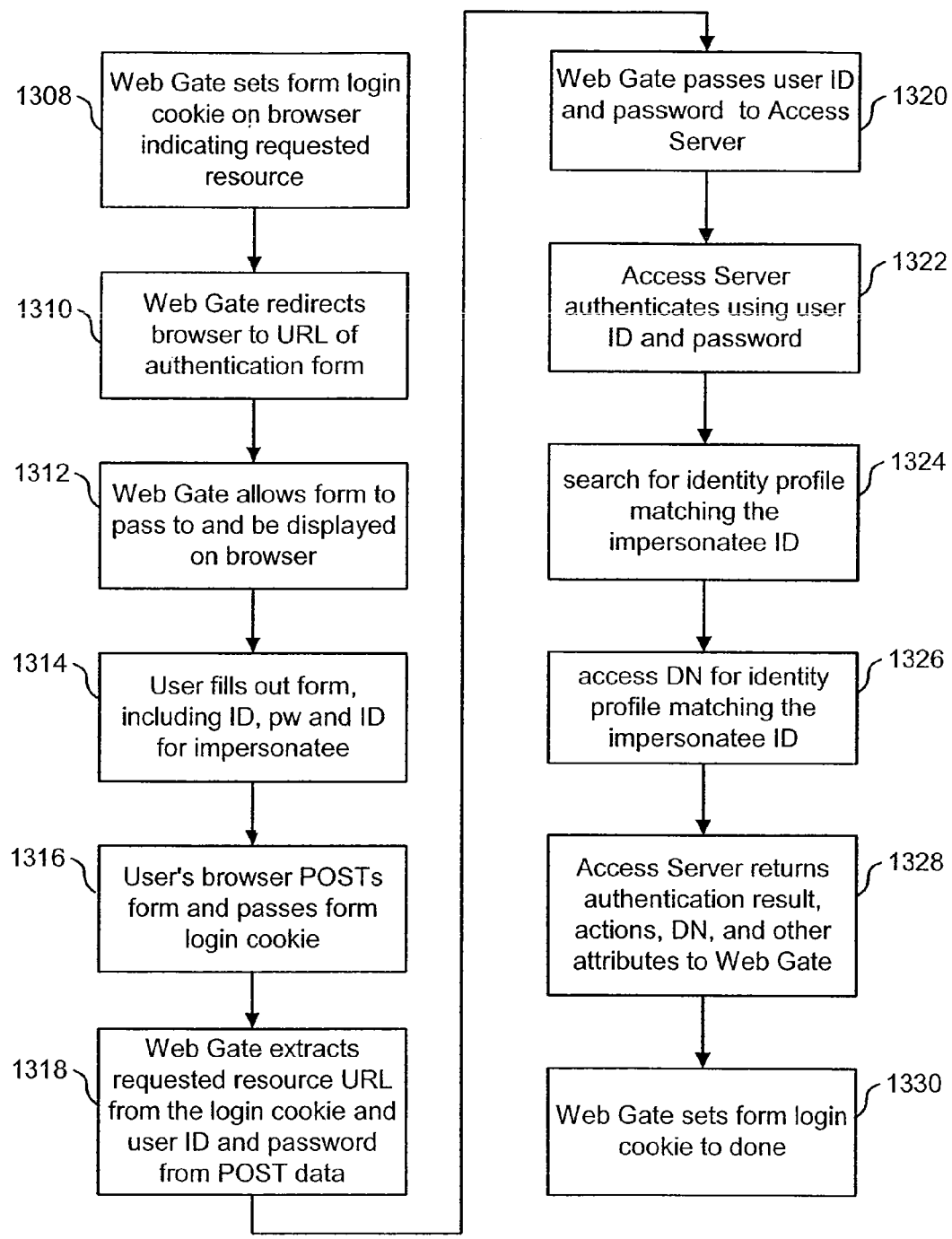
FIG. 12 is a flow chart describing an example of form authentication.

FIG. 12 provides a flow chart describing a method for performing form authentication. Form authentication includes a user being presented with a form (e.g. graphical) so that the user can provide authentication credentials and other information. In one embodiment, authentication credentials include an ID (also called a user name) and password. In other embodiments, authentication credentials can include other information to be used to authenticate. The user will also be provided with a field to enter an ID for a user to be impersonated. If the user does not enter an ID for a user to be impersonated, the user will be logged in as itself. If user A provides an ID for user B (to impersonate user B), then user A will impersonate user B as described herein. In step 1308, the system sets a "form login" cookie on browser 12. The cookie includes the URL of the requested resource. Browser 12 is then redirected to an authentication form URL (step 1310). In step 1312, Web Gate 28 allows the authentication form referenced by the authentication form URL to pass to browser 12. In step 1314, the user fills out the authentication form (e.g. ID, PW, impersonate ID) and transmits the information from the authentication form (step 1316), passing the form login cookie previously set in step 1308. Web Gate 28 then extracts the URL of the requested resource from the form login cookie (step 1318), and passes the user ID, password, and impersonate ID provided by the user in the authentication form (submitted as POST data) to Access Server 34 (step 1320).

In step 1322, the Access Server authenticates the user for the requested resource using the user's ID and password received from Web Gate 28. In step 1324, Access Server 34 sends a request to Directory Server 36 to find the identity profile having a user ID attribute that matches the ID provided for the user to be impersonated. Directory Server 36 finds the identity profile, which has as an attribute ID for the user to be impersonated. In step 1326, Access Server 34 is provided with the attributes of the identity profile for the person to be impersonated. In various embodiments, different ones of those attributes are used. In one embodiment, Access Server 34 uses the distinguished name (DN). In other embodiments, other attributes are provided. In step 1328, Access Server 34 returns the authentication result. If the result is a successful authentication (and in some embodiments, even if it is not), the Access Server returns (and, possibly carries out) the authentication actions, the DN for the person to be impersonated (based on the identity profile from step 1324 and 1326) and other attributes of interest (depending on embodiment) to Web Gate 28. In step 1330, Web Gate 28 sets the form login cookie to "done." Web Gate 28 will store the DN for the person to be impersonated in the cookie created in step 778 of FIG. 8. Note that if there is no impersonation, then steps 1324 and 1326 are not performed and, in step 1382, Access Server 34 returns the DN for the entity that was authenticated.

Figure 13:
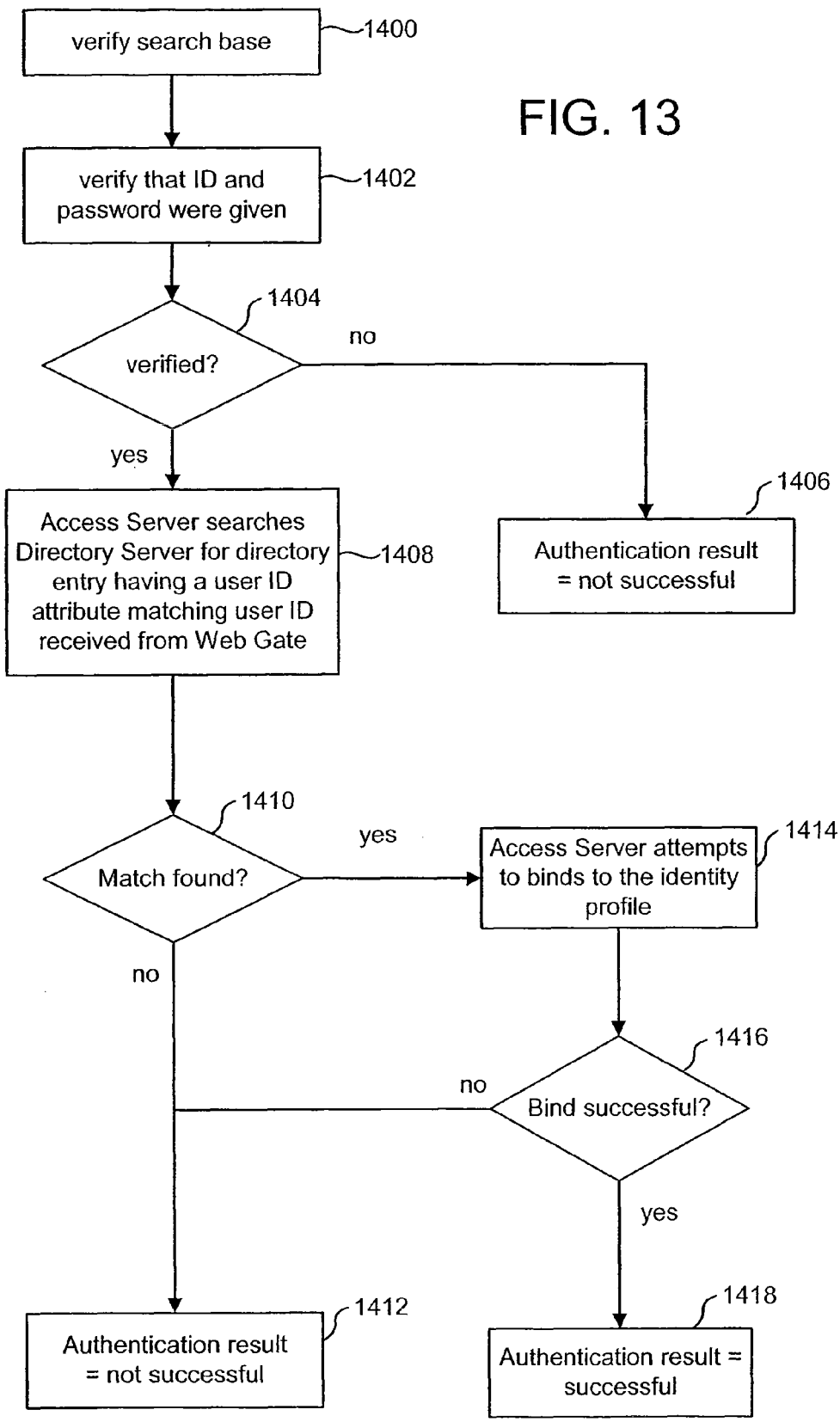
FIG. 13 is a flow chart describing one embodiment of a process to authenticate using an ID and password.

FIG. 13 provides a flow chart describing an exemplar method used by the Access Server to authenticate using a user ID and password (step 1322 of FIG. 12). In step 1400, the system verifies the search base. In some embodiments, the process of authentication is performed by a plug-in or other process. This process can be provided with a search base, which identifies a portion of the directory tree to search within in order to find the profile of the entity being authenticated. Step 1400 includes verifying that an appropriate search base was provided and that the search base provided exists in the directory tree. In other embodiments of step 1400, the system only verify that a search base was provided. In step 1402, the system will verify that an identification and password were provided for the entity being authenticated. In step 1408, the accesses will request a search of user identity profiles in Directory Server 36 for a user identity profile having a user ID attribute matching the user ID received from Web Gate 28. If no matching user identity profile attribute is found in Directory Server 36 (step 1410), the method proceeds to step 1412 and the authentication result is reported as being not successful. If a matching user identity profile is found, then the Access System attempts to bind to that user identity profile in step 1414. That is, Access Server 34 provides the password to Directory Server 36. The Directory Server verifies that the user supplied password matches the password in the identity profile. In other embodiments, other attributes can also be verified against data supplied from a login page or other source. If the bind was successful (e.g. the password matches) (step 1416), then the authentication was successful and reported as such in step 1418. If the bind was unsuccessful (step 1416), then authentication failed and is reported as being not successful in step 1412. In an alternative embodiment, after determining that the bind was successful, the system may determine whether the user being authenticated is on a revoked user list. If the user is on the revoked user list, then authentication fails. When authentication is successful, one embodiment includes retrieving all the attributes from the user's identity profile and storing them in a cache (or elsewhere) for later use with authorization.

Figure 14:
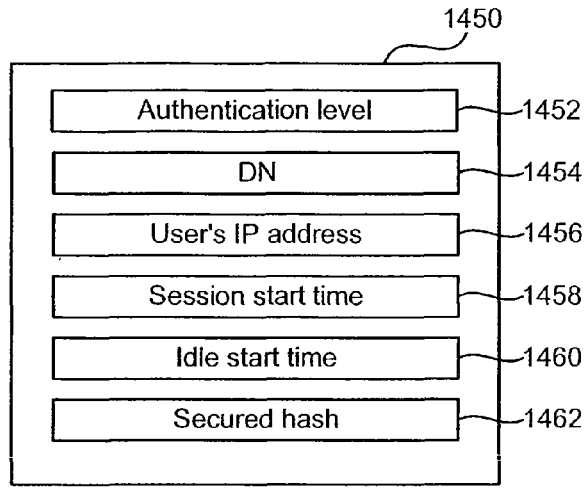
FIG. 14 is a block diagram depicting the components of one embodiment of an encrypted cookie.

FIG. 14 provides a block diagram of an authentication cookie 1450 passed by Web Gate 28 to browser 12. Cookie 1450 is encrypted with a symmetric cipher so that cookies from all instances of Web Gate 28 in a given deployment of the present invention may be encrypted using the same key. This key (shared secret) is stored on Directory Server 36 and distributed to each of the Web Gates 28 by Access Server 34. The shared secret can change as often as desired by an administrator. In one embodiment of the present invention, cookie 1450 is encrypted using RC4 encryption with a 2048 bit key. In one embodiment, previously valid keys are grand fathered such that both the current key and the immediately prior key will both work to de-crypt encrypted cookie 1450. The present invention features a one-button key re-generation function.

In one embodiment, the information stored by cookie 1450 includes the authentication level 1452 of the authentication scheme used to create the cookie, distinguished name (DN) 1454, the IP address 1456 of the authenticated user, and session start time 1458 identifying the time at which cookie 1450 was created. If the time elapsed since the session start time 1458 exceeds a maximum session time, the cookie will become invalid. Idle start time 1460 is also stored, which identifies the time when the previous HTTP request for a protected resource was made in which cookie 1450 was passed. If the time elapsed since the idle start time 1460 exceeds a maximum idle time, the cookie will become invalid. Both of these time limits force users to re-authenticate if they have left a session unattended for longer than the maximum session or idle times. Cookie 1450 also stores a secured hash 1462 of information 1452, 1454, 1456, 1458, and 1460. In one embodiment of the present invention, secured hash 1462 is created using an MD5 hashing algorithm. When user A is impersonating user B, the distinguished name stored in DN field 1454 of cookie 1450 is the distinguished name of user B which was accessed in step 1326 of FIG. 12. If there is no impersonation, then DN field 1454 stores the distinguished name of the user who was authenticated. Other embodiments store a different type of name or identification, rather than a distinguished name.

Figure 15:
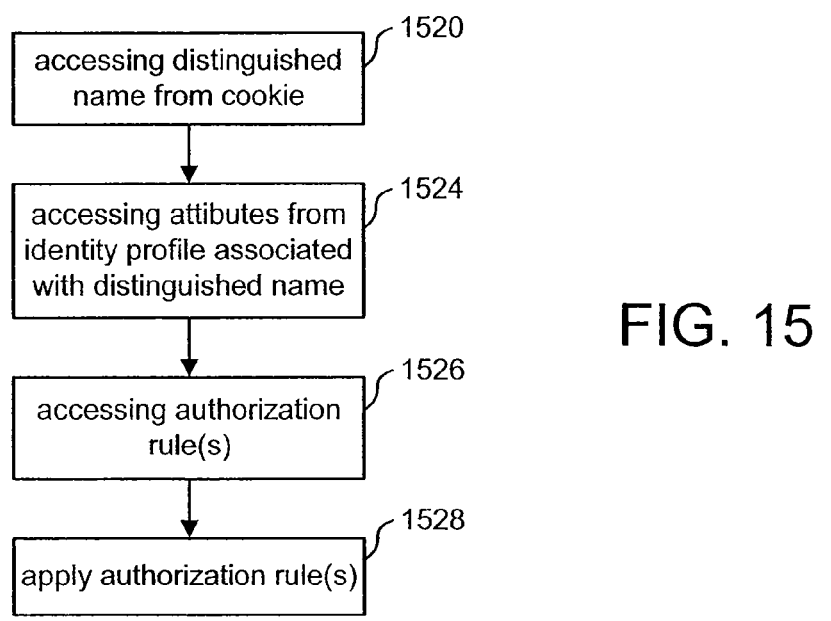
FIG. 15 is a flow chart describing one embodiment for performing authorization.

The process of authorizing (step 756 of FIG. 8) includes evaluating a set of authorization rules against attributes and/or other data. FIG. 15 is a flow chart describing one embodiment of the process for authorizing. In step 1520, the system will access the distinguished name (or other name) from the cookie. If user A is impersonating user B, then the distinguished name accessed is for user B. Thus, the Access Management System will be treating user A as if it were user B trying to be authorized. Any header variables sent to the resources will also be based on user B attributes. If user A is not trying to impersonate, then the distinguished name accessed is that of user A. In step 1524, attributes from the identity profile associated with the distinguished name of step 1520 are accessed. Thus, if user A is impersonating user B, then the attributes for user B's identity profile are accessed. In step 1526, the appropriate authorization rule(s) is accessed based on a match of the resource to a policy domain or policy.

Note that attributes and rules can be cached. In step 1528, the authorization rule(s) is applied to the attributes and/or other data.

Figure 16:
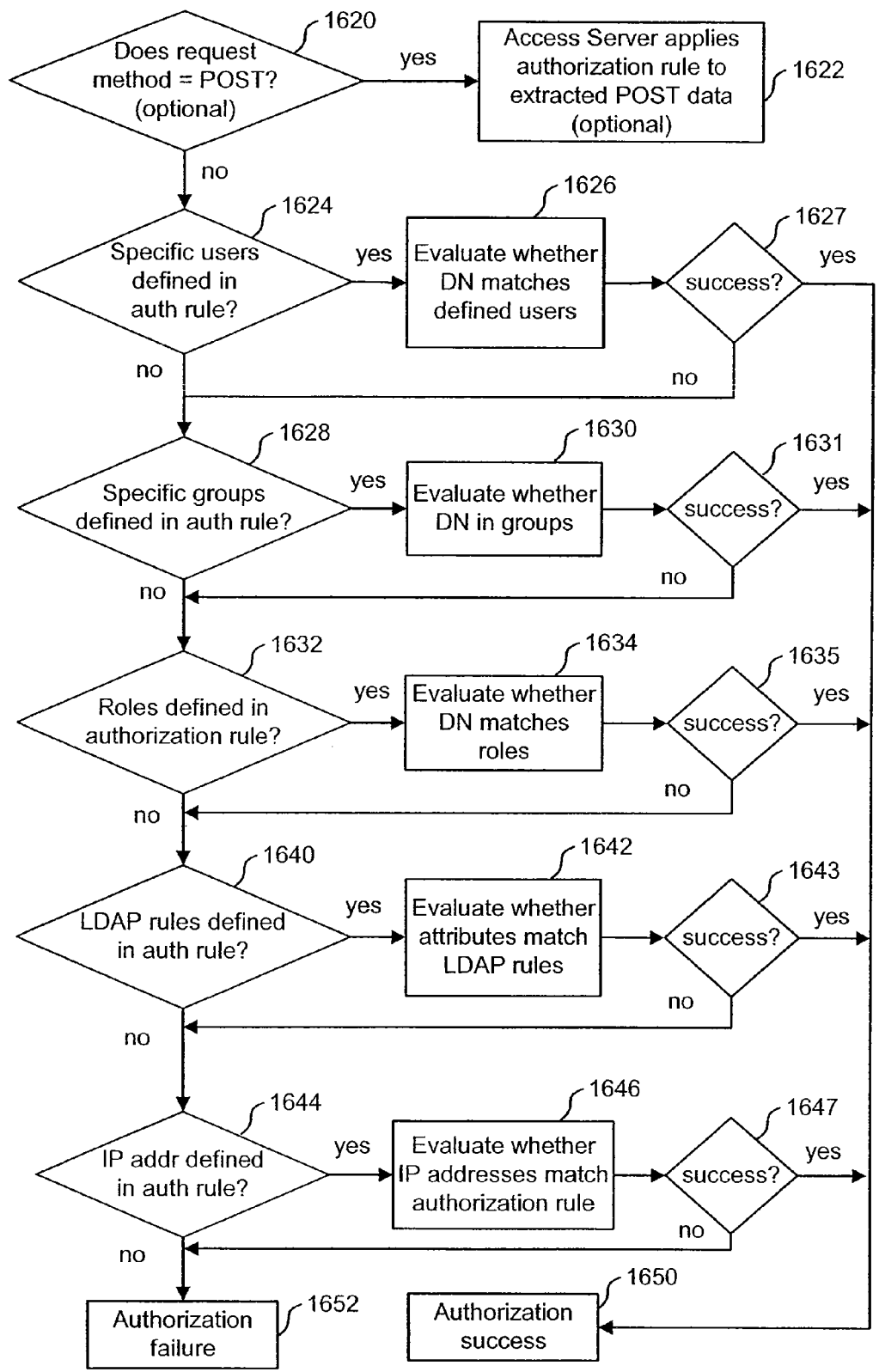
FIG. 16 is a flow chart describing a process for one embodiment of evaluating an authorization rule.

FIG. 16 provides a flow chart describing the method of applying an authorization rule. In one embodiment, authorization can be performed using POST data. In another embodiment, POST data is not used for authorization. If POST data is to be used for authorization, then the method of FIG. 16 begins with step 1620. Otherwise, the method begins at step 1624. In step 1620, if the resource request employs a POST request method, then authorization module 542 proceeds to step 1622 where it applies the authorization rule to the POST data. If the resource request does not employ a POST request method (or if POST data is not enabled to be used for authorization), then the method proceeds to step 1624. If specific users are defined (by distinguished name) in the authorization rule, the system evaluates whether the distinguished name from the cookie (e.g. impersonatee) matches the distinguished name called for by the authorization rule (step 1626). If specific groups are defined in the authorization rule (step 1628), then the system evaluates whether the distinguished name (e.g. impersonates) from the cookie is a member of the group called for by the authorization rule (step 1630). In one embodiment, the user's group membership is cached. If specific roles are defined in the authorization rule (step 1632), then the method evaluates whether the entity associated with the distinguished name from the cookie (e.g. impersonates) matches the role called for by the authorization rule (step 1634). If specific LDAP rules are defined in the authorization rule (step 1640), the system evaluates whether the attributes of the identity profile for the distinguished name from the cookie (e.g. impersonates) match the LDAP rule called for by the authorization rule (step 1642). If specific IP addresses are defined in the authorization rule (step 1644), then the system evaluates whether the IP address of the authenticated user matches the IP addresses called for by the authorization rule (step 1646). If a successful match is found at any point (steps 1627, 1631, 1635, 1643, and 1647), then the authorization is successful (step 1650). In another embodiment, multiple matches must be found before an authorization is deemed successful. For example, a user may need to satisfy an LDAP filter and have a certain IP address in order be authorized. If no matches are found, authorization is unsuccessful (step 1652).

In one embodiment of the present invention, an authentication scheme is created by defining eight sets of parameters. The first parameter is the name of the authentication scheme. The second parameter is a description of the authentication scheme. The third parameter is the level. That is, authentication schemes can be at different levels to identify which schemes are more stringent than others. The fourth parameter identifies the challenge method (e.g. basic, form, certificate, etc.). The fifth parameter identifies challenge parameters. For example, challenge parameters can include a user ID, password, ID for the impersonatee, etc. The sixth parameter indicates whether SSL is required. The seventh parameter includes a redirect URL which can be used to redirect the user after authentication is successful, after authentication has failed or prior to authentication. The eighth parameter identifies a set of plug-ins. In one embodiment, the processes for using the authentication challenge parameters (e.g. the authentication credentials) are performed by a set of plug-ins. For example, the processes of FIGS. 12 and 13 can be performed by plug-ins. In one embodiment, the process of FIG. 13 is performed by a first plug-in and the process of steps 1322-1326 (or just step 1328) are performed by a second plug-in. Source code for a sample plug-in is provided in the Appendix below. Some embodiments do not use plug-ins. Rather, the functionality is built-in.

More details of various processes for authenticating and authorizing can be found in U.S. patent application Ser. No. 09/814,091, "Access System Interface," filed on Mar. 21, 2001, Charles W. Knouse and Minoo Gupta ("'091 Application"), which in its entirety is incorporated herein by reference. Specifically, FIGS. 14-56 of the '091 Application describe the details of one set of implementations for authenticating and authorizing. FIGS. 58-62 of the '091 Application describe a set of embodiments that use an application program interface for accessing the system. The present invention can make use of the authentication and/or authorization technology described in the '091 Patent or various other methods of authentication and/or authorization. Additionally, the present invention can be used with Identity Systems like the embodiments described above, the embodiments described in FIGS. 1-13 of the '091 Patent, or other suitable systems. The present invention can also be used with an implementation that does not include an Identity System.

In addition to troubleshooting, the present invention can be used for end-user to end-user impersonation. A typical example is when a first user is on vacation and has a temporary substitute—the second user—who may require access to the applications the first user normally has access to. In this case, a feasible solution could be to use a predefined attribute in the user identity profile. Each user would have the ability to modify this. If a user A wants user B to impersonate user A, user A will update user A's profile to add user B as a value in the attribute for impersonating. Then, the above described process can be altered so that when user B authenticates and tries to impersonate user A, the system checks the attributes for user A to verify that user B is listed as an entity who can impersonate user A.

In another embodiment, an administrator can be provided with the right to impersonate. Then, only those administrators with the right to impersonate can perform the process described above in order to impersonate another user. In another option, the right to impersonate may be defined by an LDAP rule or other type of rule which limits the entities that can impersonate.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

APPENDIX

```
Copyright © 1996-2001, Oblix Inc.
#include "impersonator_authn.h"
#include <stdio.h>
#include <stdlib.h>
#include <ldap.h>
#define DEF_SERVER     "localhost"
#define DEF_PORT 389
#define DEF_MSG       "Successfully impersonating:"
FILE *fdebug = NULL;
#define AT __FILE__,__LINE__
#ifdef _DEBUG
#define debug(dstr) fprintf(fdebug, "%s:%d -",AT);fprintf dstr;fprintf
```

APPENDIX-continued

```
(fdebug,"\n");fflush(fdebug);
#else
#define debug(dstr)
#endif
int OpenDebug (const char * file) {
        fdebug = fopen (file,"a");
        if (fdebug) {
                debug ((fdebug, "Starting plugin\n"));
                return 1;
        }
        return 0;
}
void CloseDebug ( ) {
        fclose (fdebug);
}
int LdapAuth (const char *server, const char *port, const char *base const
char *filter, const char * pwd) {
  LDAP       *ld;
  LDAPMessage *result, *e;
  BerElement  *ber;
  char    *a;
  char     *lhost;
  int     lport;
  char    *dn;
  int     i, rc, num_entries, num_refs;
  /* Get a handle to an LDAP connection. */
  if (server && strlen(server)) { lhost = strdup(server); } else { lhost =
strdup(DEF_SERVER); }
  if (port && strlen(port)) { iport = atoi(port); } else
{ Iport = DEF_PORT; }
  if ((!(base && strlen(base))) (!(filter && strlen(filter)))) {
        debug((fdebug, "Invalid search base or filter, aborting"));
        return(-1);
  }
  if (!(pwd && strlen(pwd))) {
        debug((fdebug,"No password supplied. Aborting"));
        return(-1);
  }
  if ( (ld = ldap_init( lhost,lport )) == NULL ) {
   debug((fdebug,"Could connect to server (%s:%d). Aborting",lhost,lport) );
   free(lhost);
   return(-1);
  }
  free(lhost);
  /* Bind anonymously to the LDAP server. */
  rc = ldap_simple_bind_s( ld, NULL, NULL );
  if( rc ! LDAP_SUCCESS ) {
        debug((fdebug,"Error binding to the LDAP server.
ldap_simple_bind_s: %s\n" ldap_err2string(rc)));
        return(-1);
  } /* Search for the entry. */
   if ( (rc = ldap_search_ext_s( ld, base, LDAP_SCOPE_SUBTREE,
filter, NULL, 0, NULL, NULL, LDAP_NO_LIMIT,
        LDAP_NO_LIMIT, & result ) ) != LDAP_SUCCESS ) {
  }
    num_entries, = ldap_count_entries( ld, result );
   if (num_entries > 1) {
         debug((fdebug,"Error, found %d entries with that filter, when
expected asingle one. Make sure search filter is correct. Aborting",
num_entries));
        return (-1);
   }
   if (!num_entries) {
        debug((fdebug, "Found no entries. Aborting"));
        return(-1);
  }
   num_refs = ldap_count_references( ld, result );
  if (num_refs) {
    debug((fdebug,"Found %d references, however, this version of the
plugin doesn't know how to handle them"));
    return(-1);
  }
  e = ldap_first_entry( ld, result );
  if ( e != NULL ) {
    if (( dn = ldap_get_dn( ld, e )) != NULL ) {
        debug((fdebug,"Found entry: %s", dn));
        /*** Here we do the next bind ***/
        rc = ldap_simple_bind_s( ld, dn, pwd );
        if ( rc != LDAP_SUCCESS ) {
         debug((fdebug,"Error binding to the LDAP server.
ldap_simple_bind_s: %s\n", ldap_err2string(rc)));
         return(-1);
        } else {
           debug((fdebug, "Successfully authenticated %s",dn));
        }
        ldap_memfree( dn );
     } else {
        debug((fdebug,"Error getting the entry's DN"));
        return -1;
     }
   } else {
        debug((fdebug,"Error, could not get the first entry in the search"));
   }
   ldap_msgfree( result );
   ldap_unbind( ld );
   return( 0 );
}
OBDLLEXPORT
ObAuthnPluginStatus_t
ObAuthnPluginInit (ObAuthnPluginResult_t *pResult,
ObAuthnPluginGetVersion_tpVersion, const char *installDir) {
        if (OpenDebug("/tmp/impersonator.log")) {
         *pResult = strdup("Success");
         return ObAuthnPluginStatusContinue;
        } else {
           *pResult = strdup("Error opening debug file");
           return ObAuthnPluginStatusAbort;
        }
}
OBDLLEXPORT
ObAuthnPluginStatus_t
ObAuthnPluginTerminate (ObAuthnPluginResult_t *pResult, const
char *installDir)
{
        CloseDebug( );
        *pResult = strdup("Success");
        return ObAuthnPluginStatusContinue;
}
OBDLLEXPORT
ObAuthnPluginStatus_t
ObAuthnPluginFn (ObAuthnPluginCredentials_t Credentials,
ObAuthnPluginResult_t*pResult, ObAuthnPluginGetCredential_t
pGetCred, ObAuthnPluginSetCredential_t pSetCred, const
char *installDir) {
        char *ldapServe=NULL;
        char *ldapPort=NULL;
        char *ldapBase=NULL;
        char *ldapFilter=NULL;
     char *ldapPwd=NULL;
        char *impersonatee=NULL;
        if (ldapServer = (char *)pGetCred(Credentials,"ldapServer")) {
           debug((fdebug,"fetched LDALP server: %s",ldapServer));
        }
        if (ldapBase = (char *)pGetCred(Credentials,"obMappingBase")) {
           debug((fdebug, "fetched LDAP base: %s",ldapBase));
        }
        if (ldapFilter = (char *)pGetCred(Credentials,"obMappingFilter")) {
           debug((fdebug, "fetched LDAP filter: %s",ldapFilter));
        }
        if (ldapPort = (char *)pGetCred(Credentials,"ldapPort")) {
           debug((fdebug, "fetched LDAP port: %s",ldapPort));
        }
        if (ldapPwd = (char *)pGetCred(Credentials,"password")) {
           debug((fdebug,"fetched user password"));
        }
        if (impersonatee = (char *)pGetCred(Credentials,"impersonatee")) {
           debug((fdebug, "trying to impersonate: %s",impersonatee));
        } else {
           *pResult = strdup("Did not get a valid ID for user to
           impersonate");
           return ObAuthnPluginStatusDenied;
        } /* Now we do the LDAP authentication */
        if (LdapAuth (ldapServer, ldapPort, ldapBase, ldapFilter,
ldapPwd) == 0) {
           debug((fdebug, "Successful authentication"));
        *pResult = malloc (strlen(DEF_MSG)+strlen(impersonatee)+1);
           sprintf(*pResult,"%s%s",DEF_MSG,impersonatee);
```

APPENDIX-continued

```
        return ObAuthnPluginStatusContinue;
    } else {
            debug((fdebug,"Authentication failed"));
    }
    *pResult = strdup("Authentication failed");
    return ObAutlmPluginStatusDenied;
}
Source of include/impersonator_authn.h ifndef __ObAuthnAPI_h__
define __ObAuthnAPI_h__
#include <string.h>
#ifdef _WIN32
#ifndef OBDLLEXPORT
#define OBDLLEXPORT __declspec (dllexport)
#endif
#else
#ifndef OBDLLEXPORT
#define OBDLLEXPORT
#endif
#endif
typedef enum
{
 ObAuthnPluginStatusDenied = 2,
 ObAuthnPluginStatusContinue = 1,
 ObAuthnPluginStatusAbort = 0
}ObAuthnPluginStatus_t;
typedef char *ObAuthnPluginResult_t;
typedef void const* ObAuthnPluginCredentials_t;
typedef const char *(*ObAuthnPluginGetVersion_t) (void);
typedef const char *(*ObAuthnPluginGetCredentials_t)
(ObAuthnPluginCredentials_t, const char*);
typedef ObAuthnPluginStatus_t (*ObAuthnPluginSetCredential_t)
(ObAuthnPluginCredentials_t, const char*, const char*, const int);
typedef ObAuthnPluginStatus_t (*ObAuthPluginInit_t)
(ObAuthnPluginResult_t*, ObAuthnPluginGetVersion_t, const char*);
typedef ObAuthnPluginStatus_t (*ObAuthnPluginTerminate_t)
(ObAuthnPluginResult_t*, const char*);
typedef ObAuthnPluginStatus_t (*ObAuthnPluginFn_t)
(ObAuthnPluginCredentials_t, ObAuthnPluginResult_t*,
ObAuthnPluginGetCredential_t, ObAuthnPluginSetCredential_t, const
char*);
/ * ObAuthnPluginInit Defines an initialization function for an authen
plugin.
 * Parameters:
 * OUT pResult      Result message reported by the function;
 * IN   pVersion   Function callback to get the version of the
 *                 Authentication API being used.
 * IN  installDir The installation directory of the Access Server.
 * Returns:
 * ObAuthnPluginStatusContinue on successful initialization.
 * ObAuthnPluginStatusAbort on failure. */
OBDLLEXPORT ObAuthnPluginStatus_t ObAuthnPluginInit
(ObAuthnPluginResult_t*, ObAuthnPluginGetVersion_t, const char*);
/ * ObAuthnPluginTerminate
 * Defines a termination function for an authentication plugin
 * to be called when the NetPoint Access Server terminates. The
 * termination function can clean up as needed for the custom library
 * Parameters:
 * OUT pResult      Result message reported by the function;
 * IN   installDir The installation directory of the Access Server.
 * Returns:
 * ObAuthnPluginStatusContinue on successful termination.
 * ObAuthnPluginStatusAbort on failure. */
OBDLLEXPORT ObAuthnPluginStatus_t ObAuthnPluginTerminate
(ObAuthnPluginResult_t*, const char*);
/ * ObAuthnPluginFn
 * Defines a custom authentication function, to be called during
 * the authentication process. A custom function can perform
 * additional authentication processing with the user credentials
 * and can modify the list of credentials.
 * Parameters:
 * IN  Credentials Handle to the credential data supplied by the
 *            user or a previous authentication plugin.
 * OUT  Credentials Handle to the credentials, possibly modified
 *            by the ObAuthnPluginFn function.
 * OUT  pResult     Result message reported by the function; will
 * IN  pGetCred    Function callback to get credential information
 *            from the parameter Credentials
```

APPENDIX-continued

```
 * IN  pSetCred    Function callback to set credential information
 *            from the parameter Credentials
 * IN  installDir  The installation directory of the Access Server.
 *            Does not include oblix/
 * Returns:
 * ObAuthnPluginStatusContinue on successful authentication.
 * ObAuthnPluginStatusAbort on failure. */
OBDLLEXPORT ObAuthnPluginStatus_t ObAuthnPluginFn
(ObAuthnPluginCredentials_t, ObAuthnPluginResult_t*,
ObAuthnPluginGetCredential_t, ObAuthnPluginSetCredential_t, const
char*);
/ * ObAuthnPluginGetCredential
 * Retrieves a credential value from the credentials data that
 * was supplied by the user or a previous authentication plugin.
 * Parameters:
 * IN  Credentials    Handle to the credential data supplied by
 *              the user or a previous authentication plugin.
 * IN  CredentialName Name of the credentials to retrieve.
 * Returns:
 * A pointer to the credential value if the named credential
 * exists. If the named credential does not exist, NULL. */
const char *(ObAuthnPluginCredentials (ObAuthnPluginCredentials_t,
const char*);
/ * ObAuthnPluginSetCredential    Sets a credential to the specified value.
 * Parameters:
 * IN  Credentials    Handle to the credential data supplied by
 *              the user or a previous authentication plugin.
 * OUT Credentials    Handle to the modified credentials data.
 * IN  CredentialName   Name of the credentials to set.
 * IN  CredentialValue  Value to set the named credential to.
 * Returns: ObAuthnPluginStatusContinue if the named credential exists
 * and was successfully set, otherwise returns
 * ObAuthnPluginStatusAbort. */
ObAuthnPluginStatus_t ObAuthnPluginSetCredential
(ObAuthnPluginCredentials_t, const char*, const char*, const int);
/ * ObAuthnPluginGetVersion
 * Returns a pointer to the version number of the Authentication API */
*ObAuthnPluginGetVersion(void);
#endif
```

I claim:

1. A method of allowing a first user to impersonate a second user, the method comprising:

receiving at an access system authentication credentials for the first user and an identification of the second user;

authenticating by the access system said first user based on said authentication credentials for said first user;

creating by the access system a cookie that stores an indication of said second user in response to authenticating successfully; and authorizing by the access system said first user to access a first resource as said second user based on said cookie.

2. A method according to claim 1, further comprising:

providing by the access system a form for said authentication credentials, said form includes a request for a user identification, a password and an impersonatee identification, said user identification and said password correspond to said authentication credentials for said first user, said impersonatee identification corresponds to said identification of said second user.

3. A method according to claim 1, wherein:

said access system protects said first resource; and said first resource is separate from said access system.

4. A method according to claim 1, wherein:

said access system protects a plurality of resources; and said plurality of resources includes said first resource.

5. A method according to claim 1, wherein:

said cookie stores a distinguished name of said second user and an IP address for said first user.

6. A method according to claim 1, further comprising:
receiving at an access system a request to access said first resource;
providing by the access system a form for said authentication credentials, said form includes a request for a user identification, a password and an impersonatee identification, said user identification and said password correspond to said authentication credentials for said first user, said impersonatee identification corresponds to said identification of said second user; and
transmitting from the access system said cookie for storage on a device being used by said first user to send said request to access said first resource.

7. A method according to claim 1, wherein:
said access system provides access management services and identity management services; and
said first resource is protected by, but separate from, said access system.

8. A method according to claim 1, wherein:
said authentication credentials include an ID and a password;
authenticating includes:
  searching a directory server for a first user identity profile that matches said ID,
  verifying said password based on said user identity profile,
  searching said directory server for a second user identity profile that matches said identification of said second user, and
  accessing one or more attributes of said second user identity profile; and
said cookie includes said one or more attributes of said second user identity profile.

9. A method according to claim 8, wherein:
searching a directory server for a first user identity profile and verifying said password based on said user identity profile are performed by a first authentication plug-in; and
searching said directory server for a second user identity profile and accessing one or more attributes of said second user identity profile are performed by a second authentication plug-in.

10. A method according to claim 1, wherein:
said cookie stores a distinguished name for said second user; and
authorizing includes:
  accessing said distinguished name stored in said cookie,
  accessing a user identity profile for said second user based on said distinguished name,
  accessing a set of one or more authorization rules for said first resource, and
  comparing attributes of said user identity profile for said second user to said set of one or more authorization rules for said first resource.

11. A method according to claim 1, wherein:
said authentication credentials correspond to a set of attributes for said first user;
said identification of said second user corresponds to a set of attributes for said second user;
authorizing is based on one or more of said attributes for said first user; and
authorizing is based on one or more of said attributes for said second user.

12. A method according to claim 1, wherein:
said authentication credentials correspond to a set of attributes for said first user; and
authorizing is not based on attributes for said first user.

13. A method according to claim 1, further comprising:
receiving a request for a login form; and
providing said login form, said login form includes a request for a user identification, a password and an impersonatee identification, said user identification and said password correspond to said authentication credentials for said first user, said impersonatee identification corresponds to said identification of said second user.

14. A method according to claim 1, further comprising:
receiving at an access system a request from said first user to access a second resource after creating said cookie;
accessing by the access system contents of said cookie and determining not to authenticate said first user in response to said request to access said second resource; and
authorizing by the access system said first user to access said second resource as said second user based on said cookie, wherein authorizing said first user to access said second resource is performed without authenticating said first user in response to said request to access said second resource.

15. A method according to claim 1, wherein:
authenticating and authorizing are performed without knowing a password for said second user.

16. A method for impersonating, comprising:
receiving at an access system authentication credentials for an impersonator and an identification of an impersonatee at an access system, wherein said access system protects a first resource that is separate from said access system;
authenticating by the access system said impersonator based on said authentication credentials for said impersonator; and
authorizing by the access system said impersonator to access said first resource as said impersonatee.

17. A method according to claim 16, wherein:
authenticating and authorizing are performed without knowing a password for said impersonatee.

18. A method according to claim 16, wherein:
said access system protects a plurality of resources that are separate from said access system; and
said plurality of resources includes said first resource.

19. A method according to claim 16, wherein:
said authentication credentials include an ID and a password;
authenticating includes:
  searching a directory server for a first user identity profile that matches said ID,
  verifying said password based on said user identity profile,
  searching said directory server for a second user identity profile that matches said identification of said impersonatee, and
  accessing one or more attributes of said second user identity profile; and
authorizing uses said one or more attributes of said second user identity profile.

20. A method according to claim 16, wherein:
searching a directory server for a first user identity profile and verifying said password based on said user identity profile are performed by a first authentication plug-in; and
searching said directory server for a second user identity profile and accessing one or more attributes of said second user identity profile are performed by a second authentication plug-in.

21. A method according to claim 16, wherein:
authenticating provides a name for said impersonatee; and
authorizing includes:
- accessing said name,
- accessing a user identity profile for said impersonatee based on said name,
- accessing a set of one or more authorization rules for said resource, and
- comparing attributes of said user identity profile for said impersonatee to said set of one or more authorization rules for said resource.

22. A method according to claim 16, wherein:
said authentication credentials correspond to a set of attributes for said impersonator;
said identification of said impersonatee corresponds to a set of attributes for said impersonatee;
authorizing is based on one or more of said attributes for said impersonator; and
authorizing is based on one or more of said attributes for said impersonatee.

23. A method according to claim 16, further comprising:
receiving at the access system a request to access a second resource from said impersonator after authenticating said impersonator, wherein said access system protects said second resource; and
authorizing by the access system said impersonator to access said second resource as said impersonatee, wherein authorizing said impersonator to access said second resource is performed without authenticating said impersonator in response to said request to access said second resource.

24. A method of allowing a first entity to impersonate a second entity, the method comprising:
receiving at an access system authentication credentials for the first entity and an identification of the second entity at an access system, wherein said access system protects a plurality of resources;
receiving at the access system an indication of one or more of said plurality of resources;
authenticating by the access system said first entity based on said authentication credentials for said first entity; and
authorizing by the access system said first entity to access said one or more of said plurality of resources as said second entity.

25. A method according to claim 24, wherein:
said authentication credentials include an ID and a password;
authenticating includes:
- searching a directory server for a first user identity profile that matches said ID,
- verifying said password based on said user identity profile,
- searching said directory server for a second user identity profile that matches said identification of said second entity, and
- accessing one or more attributes of said second user identity profile; and
authorizing uses said one or more attributes of said second user identity profile.

26. A method according to claim 24, wherein:
authenticating provides a name for said second entity; and
authorizing includes:
- accessing said name,
- accessing a user identity profile for said second entity based on said name,
- accessing a set of one or more authorization rules for said resource, and
- comparing attributes of said user identity profile for said second entity to said set of one or more authorization rules.

27. A method according to claim 24, wherein:
said authentication credentials correspond to a set of attributes for said first entity;
said identification of said second entity corresponds to a set of attributes for said second entity;
authorizing is based on one or more attributes for said first entity; and
authorizing is not based on attributes for said first entity.

28. One or more processor readable storage devices having processor readable code stored thereon, said processor readable code, when executed by one or more processors, cause the processors to perform a method comprising:
receiving authentication credentials for a first user and an identification of a second user;
authenticating said first user based on said authentication credentials for said first user;
creating a cookie that stores an indication of said second user in response to authenticating successfully; and
authorizing said first user to access a first resource as said second user based on said cookie.

29. One or more processor readable storage devices according to claim 28, wherein:
receiving, authenticating and authorizing are performed by an access system;
said access system protects a plurality of resources separate from said access system; and
said plurality of resources includes said first resource.

30. One or more processor readable storage devices according to claim 28, wherein:
said cookie stores a distinguished name of said second user and an IP address for said first user.

31. One or more processor readable storage devices according to claim 28, wherein:
said authentication credentials include an ID and a password;
authenticating includes:
- searching a directory server for a first user identity profile that matches said ID,
- verifying said password based on said user identity profile,
- searching said directory server for a second user identity profile that matches said identification of said second user, and
- accessing one or more attributes of said second user identity profile; and
said cookie includes said one or more attributes of said second user identity profile.

32. One or more processor readable storage devices according to claim 28, wherein:
said cookie stores a distinguished name for said second user; and
authorizing includes:
- accessing said distinguished name stored in said cookie,
- accessing a user identity profile for said second user based on said distinguished name,
- accessing a set of one or more authorization rules for said first resource, and
- comparing attributes of said user identity profile for said second user to said set of one or more authorization rules for said first resource.

33. One or more processor readable storage devices according to claim 28, wherein:
said authentication credentials correspond to a set of attributes for said first user;
said identification of said second user corresponds to a set of attributes for said second user;
authorizing is based on one or more of said attributes for said first user; and
authorizing is based on one or more of said attributes for said second user.

34. One or more processor readable storage devices according to claim 28, wherein:
receiving a request from said first user to access a second resource after creating said cookie;
accessing contents of said cookie and determining not to authenticate said first user in response to said request to access said second resource; and
authorizing said first user to access said second resource as said second user based on said cookie, wherein authorizing said first user to access said second resource is performed without authenticating said first user in response to said request to access said second resource.

35. An apparatus for providing access management that allows for impersonating, comprising:
a communication interface;
a storage device; and
a processing unit in communication with said communication interface and said storage device, said processing unit performs a method comprising:
receiving authentication credentials for a first user and an identification of a second user,
authenticating said first user based on said authentication credentials for said first user,
creating a cookie that stores an indication of said second user in response to authenticating successfully, and
authorizing said first user to access a first resource as said second user based on said cookie.

36. An apparatus according to claim 35, wherein:
receiving, authenticating and authorizing are performed by an access system;
said access system protects a plurality of resources separate from said access system; and
said plurality of resources includes said first resource.

37. An apparatus according to claim 35, wherein:
said authentication credentials include an ID and a password;
authenticating includes:
searching a directory server for a first user identity profile that matches said ID,
verifying said password based on said user identity profile,
searching said directory server for a second user identity profile that matches said identification of said second user, and
accessing one or more attributes of said second user identity profile; and
said cookie includes said one or more attributes of said second user identity profile.

38. An apparatus according to claim 35, wherein:
said cookie stores a distinguished name for said second user; and
authorizing includes:
accessing said distinguished name stored in said cookie,
accessing a user identity profile for said second user based on said distinguished name,
accessing a set of one or more authorization rules for said first resource, and
comparing attributes of said user identity profile for said second user to said set of one or more authorization rules for said first resource.

39. One or more processor readable storage devices having processor readable code stored thereon said processor readable code, when executed by one or more processors, cause the processors to perform a method comprising:
receiving authentication credentials for an impersonator and an identification of an impersonatee at an access system, said access system protects a first resource that is separate from said access system;
authenticating said impersonator based on said authentication credentials for said impersonator, wherein authenticating is performed by said access system; and
authorizing said impersonator to access said first resource as said impersonatee, wherein authorizing is performed by said access system.

40. One or more processor readable storage devices according to claim 39, wherein:
said access system protects a plurality of resources that are separate from said access system; and
said plurality of resources includes said first resource.

41. One or more processor readable storage devices according to claim 39 wherein:
said authentication credentials include an ID and a password;
authenticating includes:
searching a directory server for a first user identity profile that matches said ID,
verifying said password based on said user identity profile,
searching said directory server for a second user identity profile that matches said identification of said impersonatee, and
accessing one or more attributes of said second user identity profile; and
authorizing uses said one or more attributes of said second user identity profile.

42. One or more processor readable storage devices according to claim 39, wherein:
authenticating provides a name for said impersonatee; and
authorizing includes:
accessing said name,
accessing a user identity profile for said impersonatee based on said name,
accessing a set of one or more authorization rules for said resource, and
comparing attributes of said user identity profile for said impersonatee to said set of one or more authorization rules for said resource.

43. One or more processor readable storage devices according to claim 39, wherein:
said authentication credentials correspond to a set of attributes for said impersonator;
said identification of said impersonatee corresponds to a set of attributes for said impersonatee;
authorizing is based on one or more of said attributes for said impersonator; and
authorizing is based on one or more of said attributes for said impersonatee.

44. One or more processor readable storage devices according to claim 39, wherein said method further comprises:
receiving a request to access a second resource from said impersonator after authenticating said impersonator, said access system protects said second resource; and authorizing said impersonator to access said second resource as said impersonatee, wherein authorizing said impersonator to access said second resource is performed without authenticating said impersonator in response to said request to access said second resource.

45. An apparatus for providing access management that allows for impersonating, comprising:
    a communication interface;
    a storage device; and
    a processing unit in communication with said communication interface and said storage device, said processing unit performs a method comprising:
        receiving authentication credentials for an impersonator and an identification of an impersonatee at an access system, said access system protects a first resource that is separate from said access system,
        authenticating said impersonator based on said authentication credentials for said impersonator, wherein authenticating is performed by said access system, and
        authorizing said impersonator to access said first resource as said impersonatee, wherein authorizing is performed by said access system.

46. An apparatus according to claim 45, wherein:
    said access system protects a plurality of resources that are separate from said access system; and
    said plurality of resources includes said first resource.

47. An apparatus according to claim 45, wherein:
    said authentication credentials include an ID and a password;
    authenticating includes:
        searching a directory server for a first user identity profile that matches said ID,
        verifying said password based on said user identity profile,
        searching said directory server for a second user identity profile that matches said identification of said impersonatee, and
        accessing one or more attributes of said second user identity profile; and
    authorizing uses said one or more attributes of said second user identity profile.

48. An apparatus according to claim 45, wherein:
    authenticating provides a name for said impersonatee; and
    authorizing includes:
        accessing said name,
        accessing a user identity profile for said impersonatee based on said name,
        accessing a set of one or more authorization rules for said resource, and
        comparing attributes of said user identity profile for said impersonatee to said set of one or more authorization rules for said resource.

* * * * *

UNITED STATES PATENT AND TRADEMARK OFFICE
CERTIFICATE OF CORRECTION

| | | |
|---|---|---|
| PATENT NO. | : 7,765,298 B2 | |
| APPLICATION NO. | : 11/560469 | |
| DATED | : July 27, 2010 | |
| INVENTOR(S) | : Francisco J. Villavicencio | |

It is certified that error appears in the above-identified patent and that said Letters Patent is hereby corrected as shown below:

On page 4, in column 1, under "Other Publications", line 37, delete "Wirsless" and insert -- Wireless --, therefor.

On sheet 9 of 12, in Figure 15, Box no. 1524, line 1, delete "attributes" and insert -- attributes --, therefor.

In column 1, line 15, Above "BACKGROUND OF THE INVENTION" insert -- COPYRIGHT NOTICE A portion of the disclosure of this patent document contains material which is subject to copyright protection. The copyright owner has no objection to the reproduction by anyone of the patent document or the patent disclosure as it appears in the United States Patent and Trademark Office patent file or records, but otherwise reserves all copyright rights whatsoever. --.

In column 2, line 62, delete "impersonates)." and insert -- impersonatee). --, therefor.

In column 3, line 8, delete "Impersonatation" and insert -- Impersonation --, therefor.

In column 9, line 12, delete "Empl, ,O=" and insert -- Empl, O= --, therefor.

In column 19, line 23, delete "impersonates)" and insert -- impersonatee) --, therefor.

In column 19, line 28, delete "impersonates)" and insert -- impersonatee) --, therefor.

In column 19, line 33, delete "impersonates)" and insert -- impersonatee) --, therefor.

Signed and Sealed this
Tenth Day of May, 2011

David J. Kappos
*Director of the United States Patent and Trademark Office*